TRANSLATORS FOR USE IN TELECOMMUNICATION SWITCHING SYSTEMS

Filed March 27, 1967 17 Sheets-Sheet 1

INVENTORS
MICHAEL TURNER HILLS
MARTIN WARD
BY Kinzler, Kinzler & Ottenger(?)
ATTORNEYS INVENTORS
Michael Turner Hills
Martin Ward
BY Kirschstein, Kirschstein & Ottinger
ATTORNEYS INVENTORS
MICHAEL TURNER HILLS
MARTIN WARD
BY Kimberlin, Kimberlin & Olley
ATTORNEYS INVENTORS
MICHAEL TURNER HILLS
MARTIN WARD
BY
[signature]
ATTORNEYS INVENTORS
MICHAEL TURNER HILLS
MARTIN WARD
BY Cushman, Darby & Cushman
ATTORNEYS INVENTORS
MICHAEL TURNER HILLS
MARTIN WARD
BY
[signature]
ATTORNEYS INVENTORS
MICHAEL TURNER HILLS
MARTIN WARD
BY [signature]
ATTORNEYS INVENTORS
MICHAEL TURNER HILLS
MARTIN WARD
BY Kinchelon, Kinchelon & Ottinger
ATTORNEYS Sept. 8, 1970 M. T. HILLS ET AL 3,527,896

TRANSLATORS FOR USE IN TELECOMMUNICATION SWITCHING SYSTEMS

Filed March 27, 1967 17 Sheets-Sheet 9

INVENTORS
MICHAEL TURNER HILLS
MARTIN WARD
BY Kurlen..., Kurlen... and Ottinger
ATTORNEYS INVENTORS
MICHAEL TURNER HILLS
MARTIN WARD
BY Kurtz, Kurtz & Ortega
ATTORNEYS INVENTORS
Michael Turner Hills
Martin Ward
BY Kurlandsky, Kurlandsky & Ottaga
ATTORNEYS INVENTORS
Michael Turner Hills
Martin Ward
BY Kinzleton, Kinzleton & Ottey
ATTORNEYS INVENTORS
MICHAEL TURNER HILLS
MARTIN WARD
BY [signature]
ATTORNEYS INVENTORS
Michael Turner Hills
Martin Ward
BY Kinzler, Kinzler & Attys
ATTORNEYS INVENTORS
Michael Turner Hills
Martin Ward
BY Kemon, Palmer & Estabrook [signature]
ATTORNEYS INVENTORS
MICHAEL TURNER HILLS
MARTIN WARD
BY Kinzer, Dorn, Zickert & Attys
ATTORNEYS

| Storage Location | A | B | C | D | E |
|---|---|---|---|---|---|
| 039 | 0 | 03 | 061 | 10 | 141 (SAY) |
| 061 | 0 | 04 | 029 | 03 | 152 |
| 029 | 0 | 01 | 043 | 02 | 142 (SAY) |
| 043 | 0 | 01 | 047 | 01 | 143 (SAY) |
| 047 | 1 | | | | T |

Fig. 20

| Word No. \ Digit No. | C (15 14 13 12 11) | B (10 9 8 7 6) | A (5 4 3 2 1) |
|---|---|---|---|
| 1 | — | STATE OF CALL "A" | |
| 2 | — | STATE OF CALL "B" | |
| 3 | ROUTING DIGIT COUNT | DIALLING-IN INDEX | |
| 4 | DIGIT "A" / (1). DIGITS B or D (2). TYPE OF CALL | (2) IMPULSING-OUT INDEX (1) DIGITS C or E | |
| 5 | (1). FORCE RELEASE TIME-OUT (2). RELEASE TIME-OUT | (2). END OF DIALLING OR I.T.P. TIME-OUT | |
| 6 | — | IMPULSING-OUT I.T.P. TIME OUT | |
| 7 | DIFFERENCE COUNT | INPUT DIGITS COUNT | 66 ms. TIME-OUT |
| 8 | TRANSLATOR STORE OUTPUT SELECTION | TRANSLATOR STORE INPUT ADDRESS | |
| 9 | 3 | 2 | 1 |
| 10 | 6 | 5 | 4 |
| 11 | 9 | 8 | 7 |
| 12 | 12 | 11 | 10 |
| 13 | 15 | 14 | 13 |
| 14 | 18 | 17 | 16 |

Words 9–14: Incoming Digits

Fig. 21

INVENTORS
MICHAEL TURNER HILLS
MARTIN WARD
BY Kurtz, Kurtz & Olt
ATTORNEYS

United States Patent Office 3,527,896
Patented Sept. 8, 1970

3,527,896
TRANSLATORS FOR USE IN TELECOMMUNICATION SWITCHING SYSTEMS

Michael Turner Hills, West Ealing, London, and Martin Ward, Coventry, England, assignors to The General Electric Company, Limited, London, England, a British company Filed Mar. 27, 1967, Ser. No. 626,236
Claims priority, application Great Britain, Mar. 28, 1966, 13,496/66
Int. Cl. H04q 3/47
U.S. Cl. 179—18 6 Claims

ABSTRACT OF THE DISCLOSURE

A register-translator which operates under the control of a stored programme to gain access to a succession of different storage locations of a digital data store in response to input routing digits supplied to the register-translator.

Figures 1, 11:
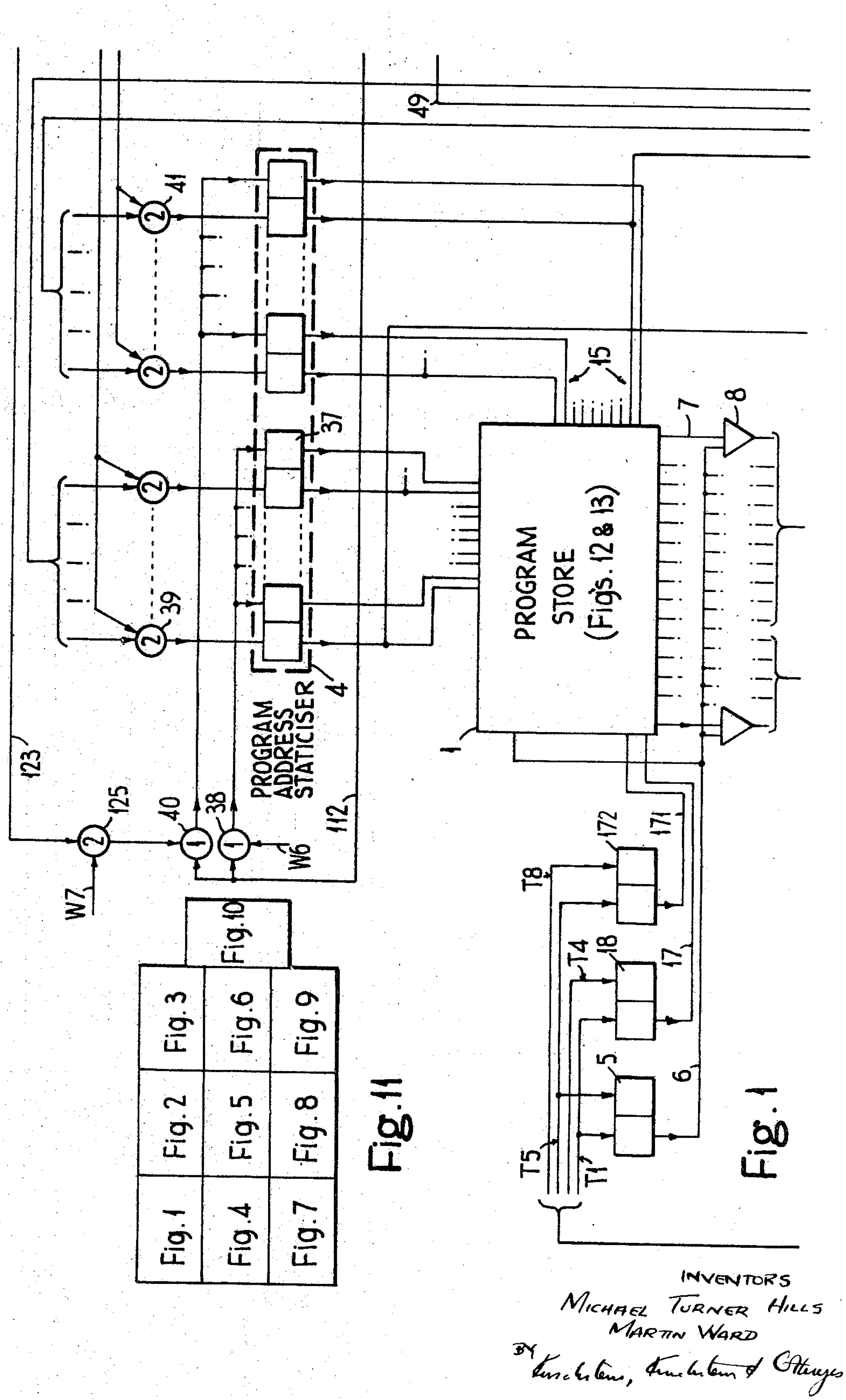
Figure 2:
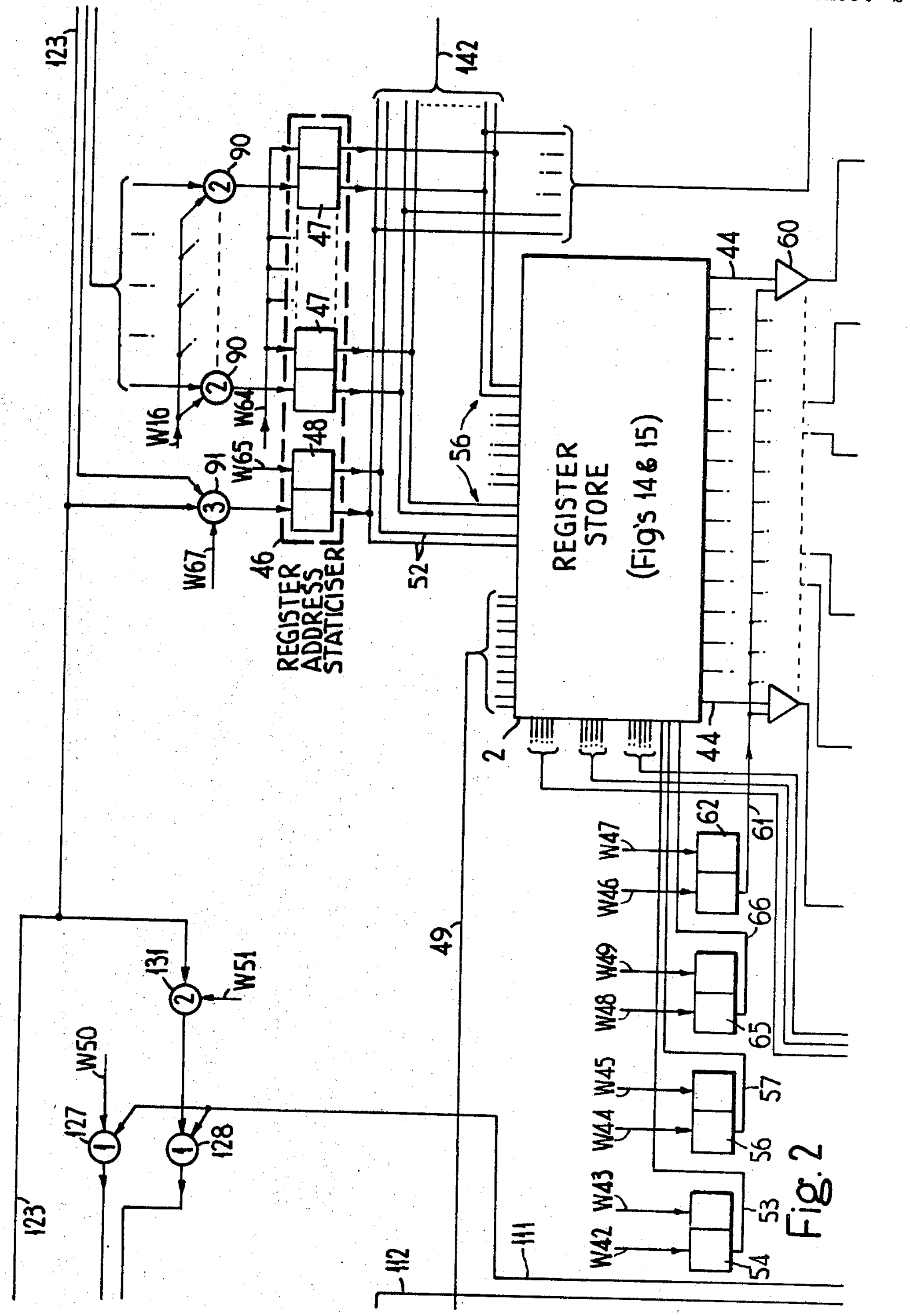

The last storage location to which access is gained in connection with a particular call stores the regained translation, namely output routing digits, while every other location to which access is gained stores the address within the store of two different storage locations. One of these addresses is utilised if the next storage location to which access is gained is associated with the same input routing digit as the location in question while the other address is utilised if the next storage location is associated with the next digit.

This invention relates to translators for use in telecommunication switching systems.

It is well kwnown in an automatic telephone system, for example, to provide a translator which responds to input information (frequently at the present time in the form of trains of impulses) that characterise the exchange of a subscriber being called and which derives further information (again often in the form of trains of impulses) that is utilised by the telephone system for setting up a connection to the called subscriber's exchange. A Strowger-type director is such a translator, there being provided a translation jumper field between a first group of terminals, one of which has a signal supplied to it during the setting up of a call in dependence upon the input trains of impulses characterising the called subscriber's exchange, and a second group of terminals to which an impulsing-out circuit is connected. With such an arrangement a translation may be changed by altering the connections of a wire in the jumper field but it will be appreciated that, since it is not known at the time of initial installation what translations will later be required, it is necessary to provide the terminals for all possible translations even though many of these will never be required. Thus in the case of only a three-digit translation, there would be one thousand terminals in the first group although only a few hundred might ever be used while for translations involving more digits the number of terminals increases rapidly.

One object of the present invention is to provide a translator for a telecommunication switching system in which the above difficulty is largely avoided.

According to the present invention a translator for a telecommunication switching system has a plurality of translation locations of storage to which access is gained in dependence upon input information supplied to the translator, each of these locations storing the required output information to be supplied by the translator, and at least some of these translation locations being reached by way of one or more intermediate locations of storage which each store information as to the next storage location (which may be either a translation location or an intermediate location) both if the location is in the same branch or in another branch of the organisation tree of the translator. (The full significance of the word "branch" in this context of reaching a translation location is discussed subsequently herein with particular reference to FIG. 18 of the accompanying drawings.)

At least some of the intermediate storage locations may also each store information as to the additional minimum value of a digit signalled to the translator before proceeding to the next storage location in the same branch and information as to the minimum value of the next digit that must be signalled to the translator before proceeding to the next storage location in another branch. Thus, if the input information is presented to the translator as a plurality of trains of impulses, the intermediate storage locations may also store information as to the number of impulses that must be received before proceeding to the next storage location if in the same branch and the number of impulses that must be received before proceeding to the next storage location if in another branch.

A translator in accordance with the present invention may in fact be a register translator, that is to say a tranlator which has provision for temporarily storing information (for example as to the number of a called subscriber on his exchange) that is not required for the purpose of the translation and which is passed on without translation.

Figure 12:
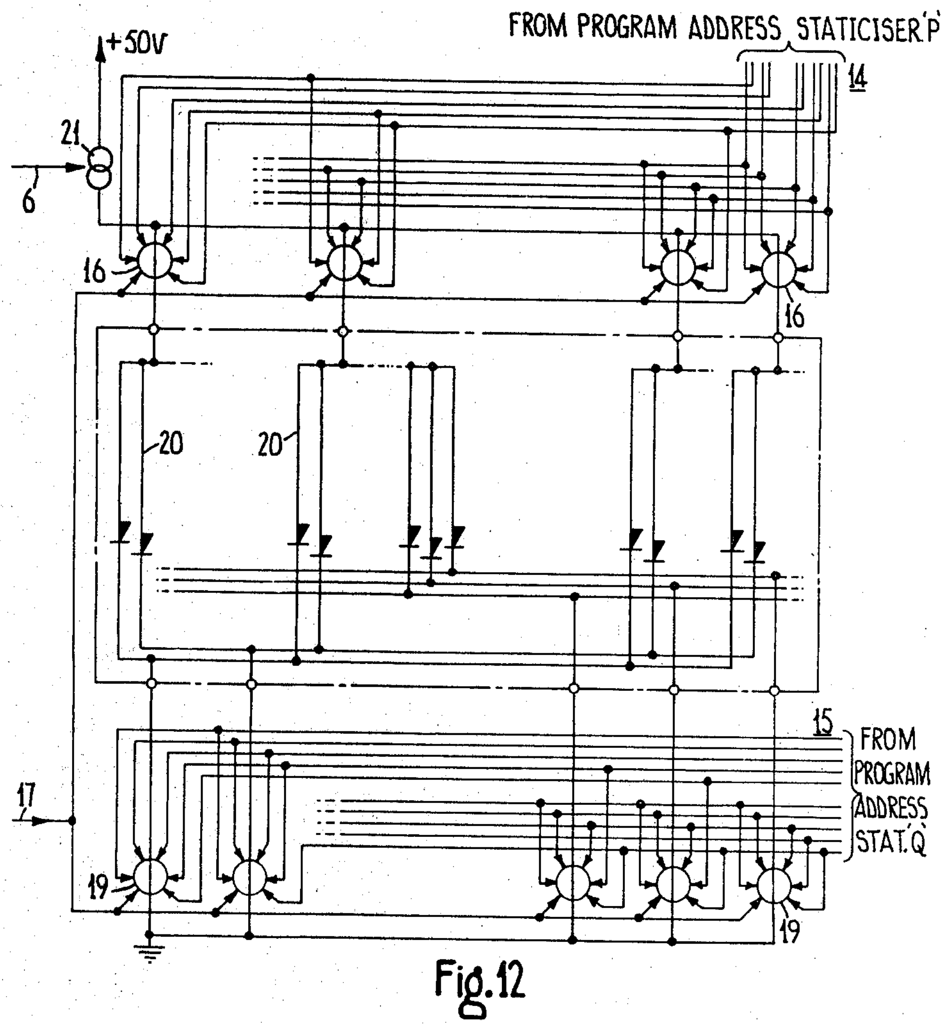
Figure 13:
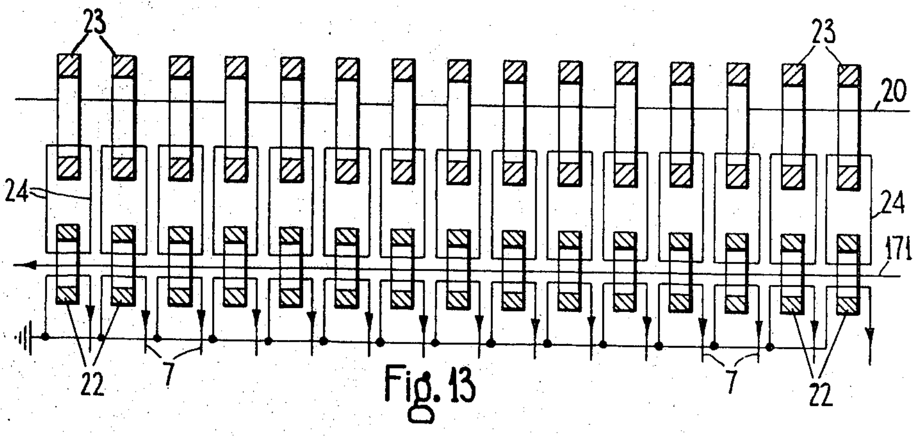
Figure 14:
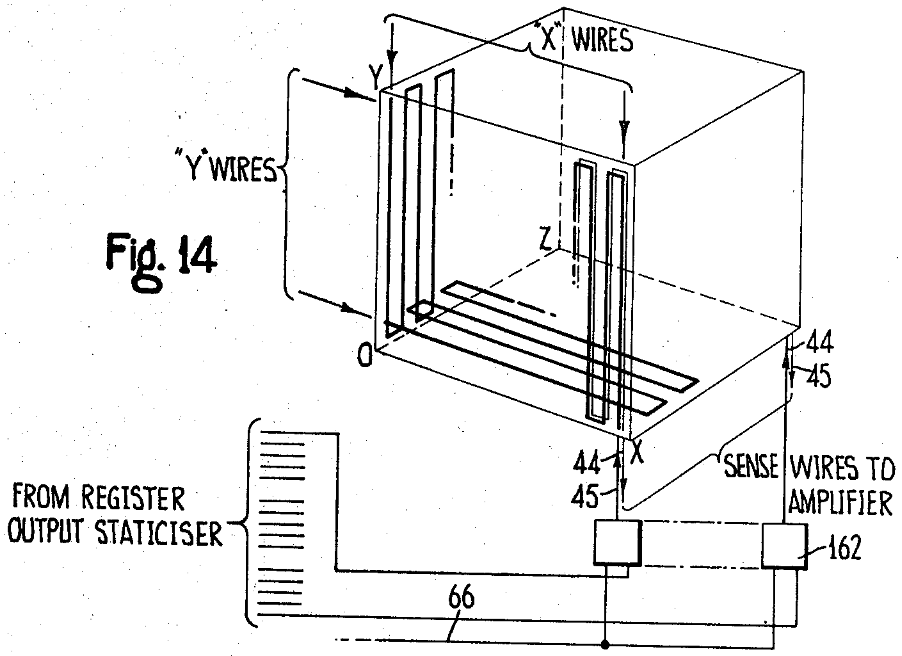
Figure 15:
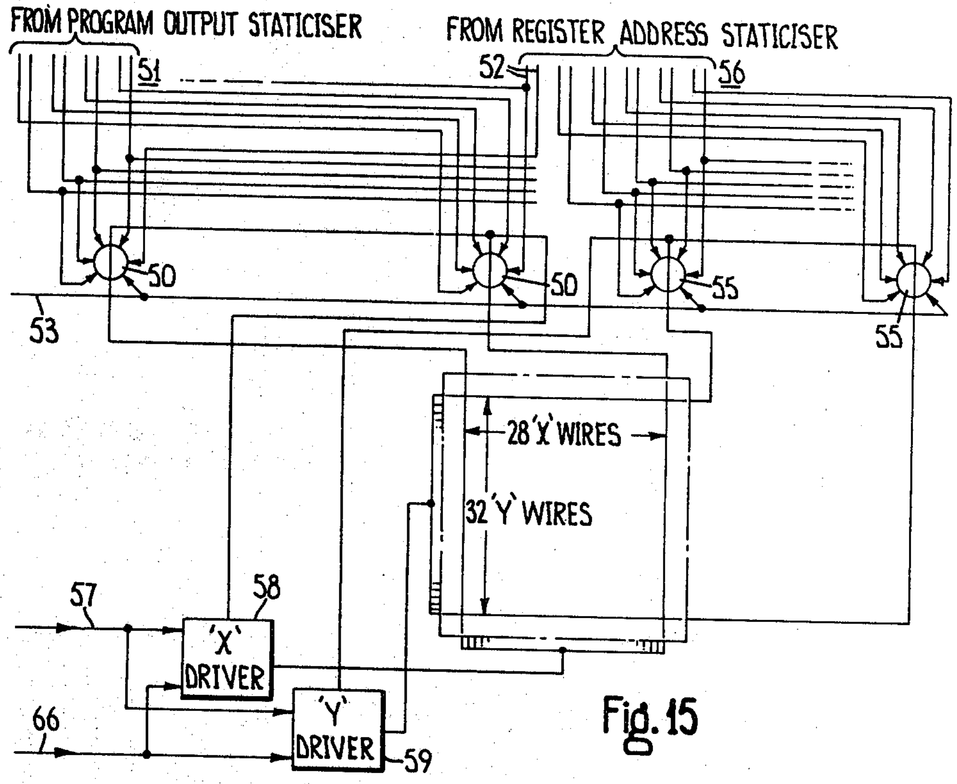
Figure 16:
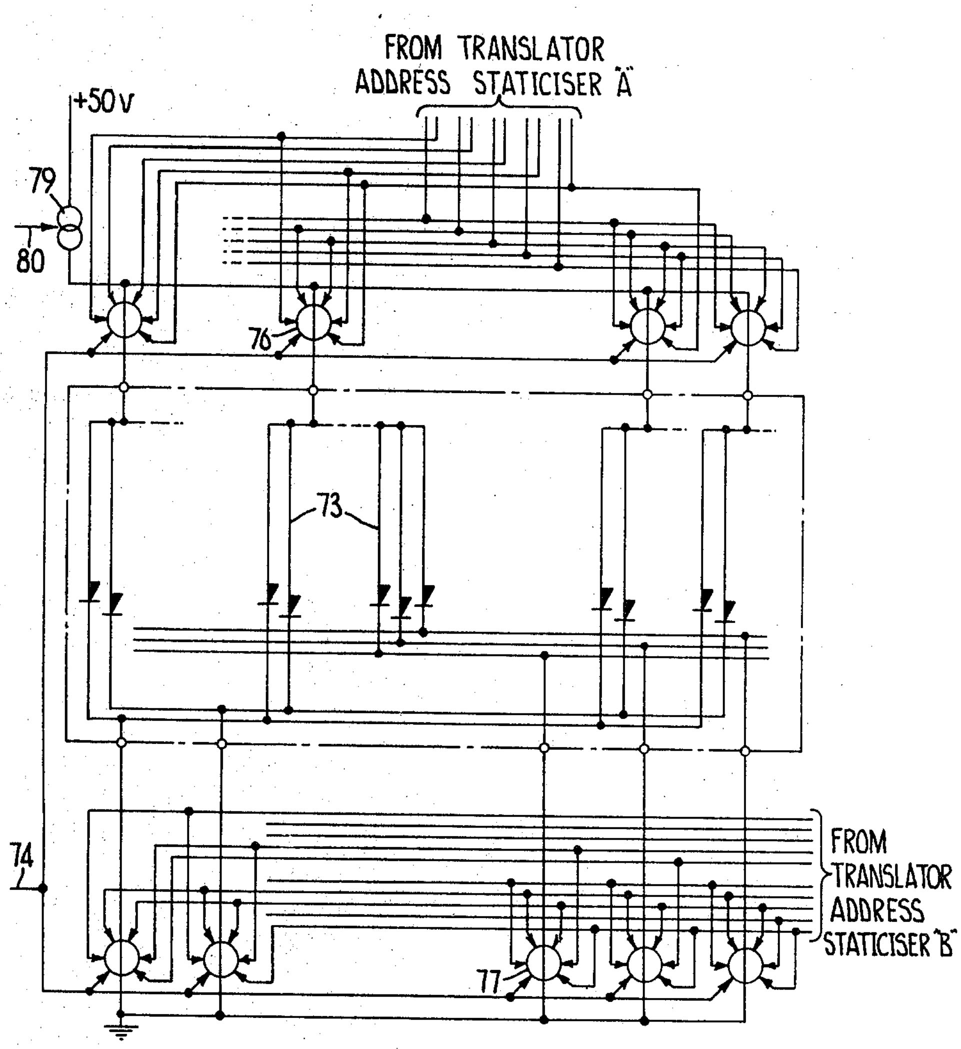
Figure 17:
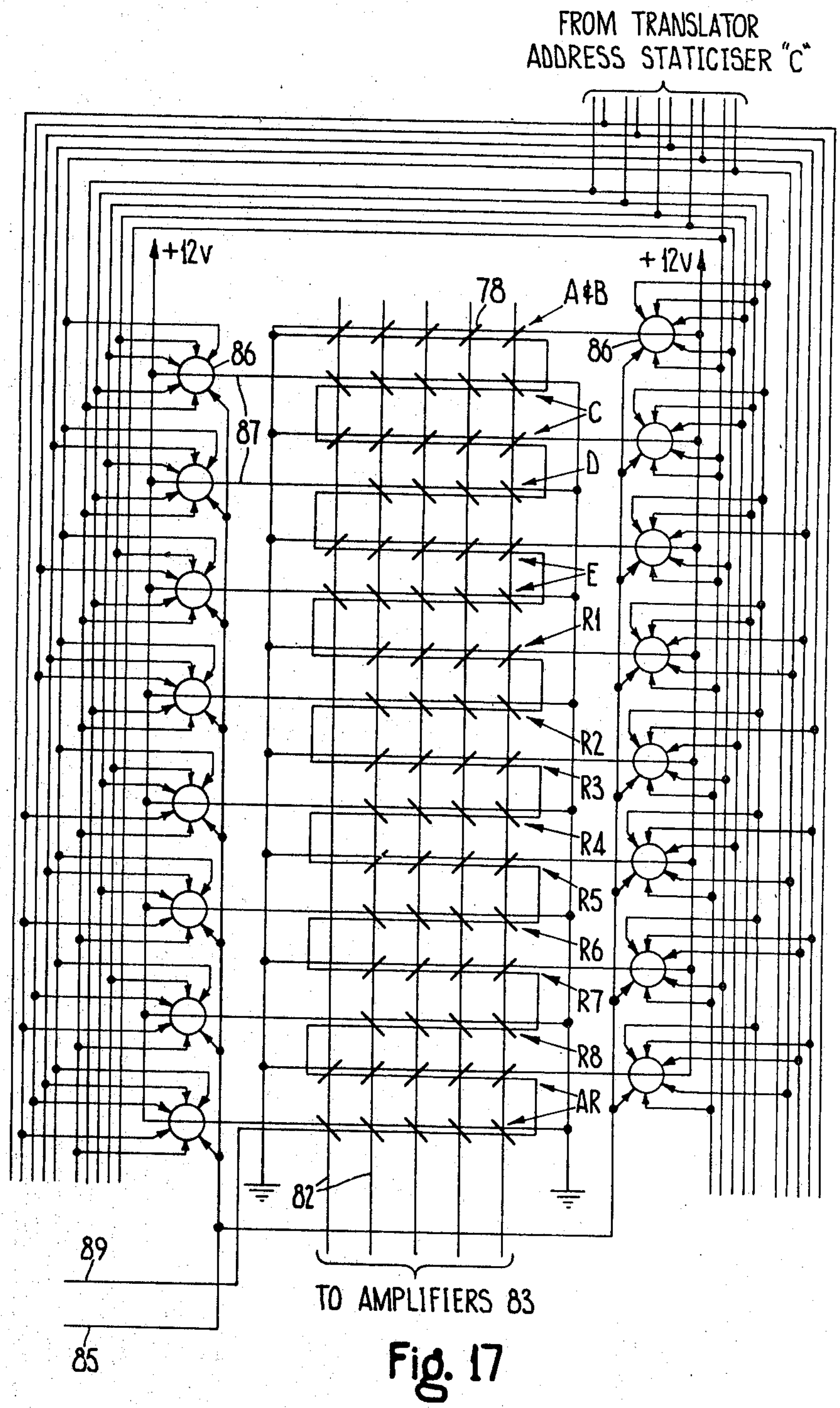
Figure 18:
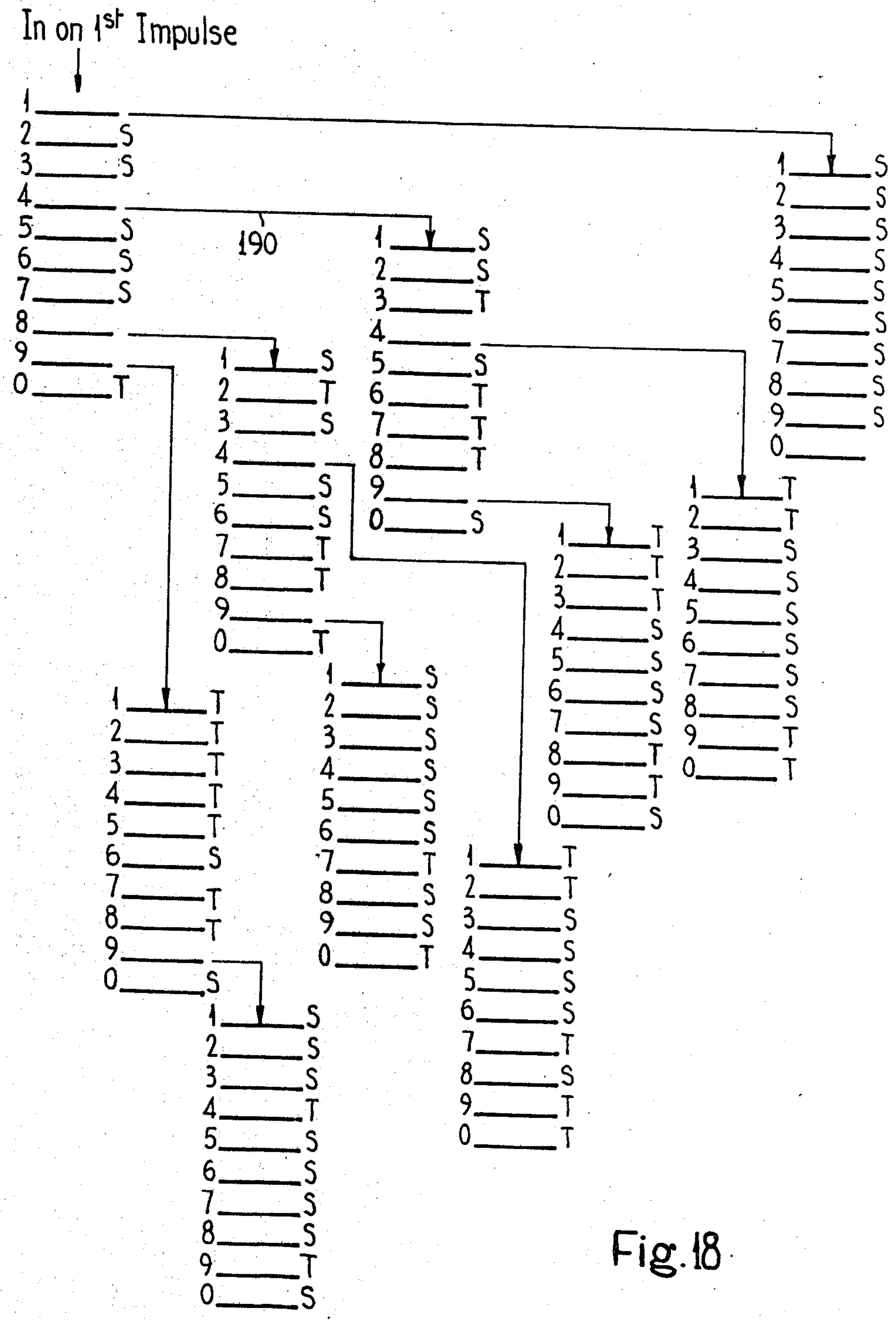
Figure 19:
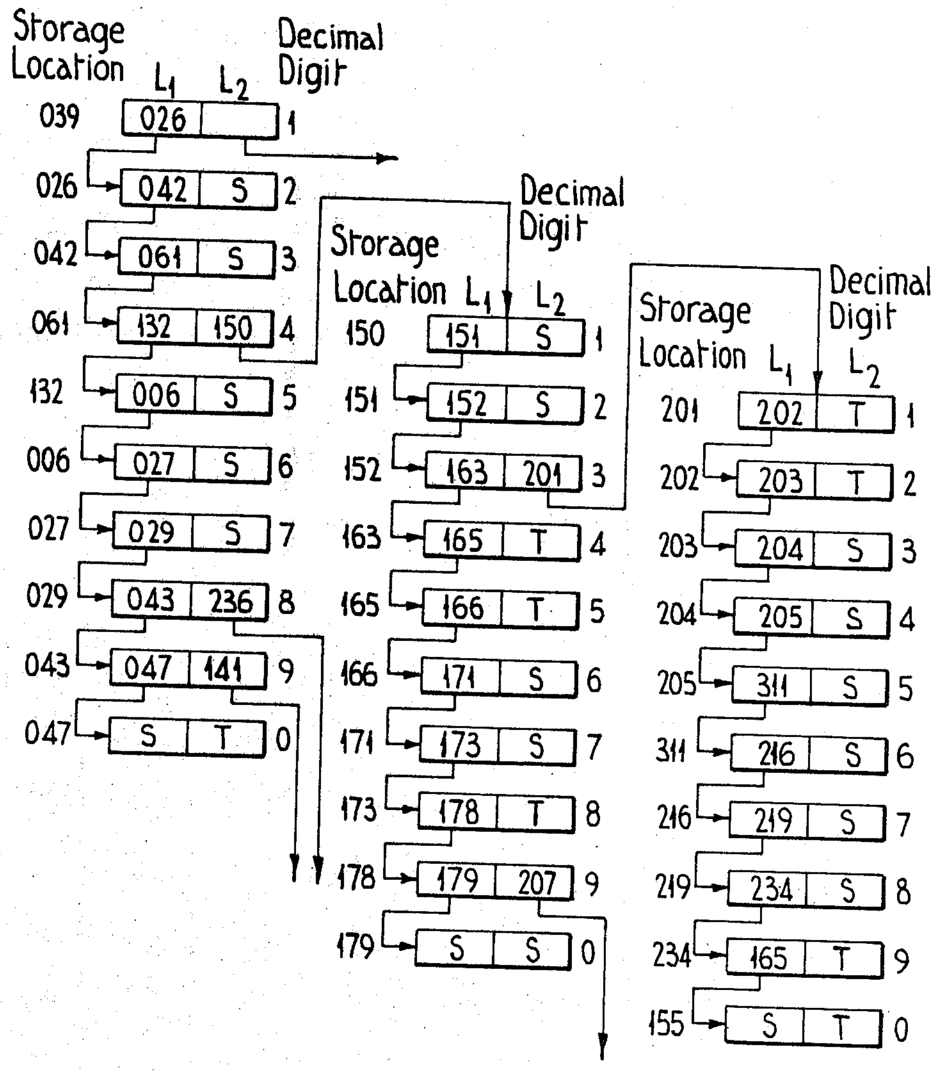

One example of a register translator which is for use with an automatic telephone system and which is in accordance with the present invention will now be described with reference to the accompanying drawings in which:

FIGS. 1 to 10 when arranged in the manner of FIG. 11 show diagrammatically the complete register translator together with the access circuit by way of which the translator is connected to the telephone system, FIGS. 12 and 13 show the program store of the register translator in more detail, FIGS. 14 and 15 show the register store in more detail, FIGS. 16 and 17 show the translator store in more detail, FIG. 18 is an explanatory diagram, FIG. 19 is an explanatory diagram derived from part of FIG. 18, FIG. 20 is a further explanatory diagram derived from part of FIG. 19, and FIG. 21 shows the arrangement of data stored in the register store.

The register translator now to be described is adapted to respond to input trains of dial impulses supplied by a telephone subscriber that characterise the exchange and number of a called subscriber. The translator supplies output trains of impulses some of which characterise a route for setting up a connection to the exchange of the called subscriber, these trains of impulses being acted on within the telephone system to set up such a route if that is possible, and the remainder of which characterise the called subscriber's number, these latter trains effectively being a repetition of the corresponding input trains.

The translator is capable of handling sixty-four calls contemporaneously on a time-shared basis. It can therefore be considered as sixty-four separate register translators although the major part of the equipment is common.

Although the input and output trains of impulses are each of decimal form (i.e. representing a decimal digit), the register translator is purely binary in operation and decimal digits are stored in binary-coded decimal form.

Referring now to FIGS. 1 to 10 of the drawings, the register translator comprises a program store 1, a register store 2 and a translator store 3. As will subsequently be apparent, information is passed between these three stores 1, 2 and 3 and other items of the translator by way of three highways, namely the highway A, the highway B and the highway C, and each of these highways is constituted by five separate wires A1 to A5, B1 to B5 or C1 to C5.

The program store 1 is adapted to store 1024 words each of fifteen binary digits. The fifteen digits of any program word are read out in parallel by energising the appropriate one of 1024 address wires (not shown in FIG. 1) as determined by information stored by a program address staticiser 4. Each program word may be considered as being made up of three five-digit sub-words. One of these sub-words specifies an instruction to be performed (this sub-word is hereinafter referred to as "sub-word I") while the other two sub-words (hereinafter referred to as "sub-word $\alpha$" and "sub-word $\beta$") characterise an address. A program word read from the program store 1 results in signals each representing one binary digit of the word being supplied over leads 7 to fifteen amplifiers 8 which are turned on at this time by a signal supplied by a bistable circuit 5 over a lead 6. The signals passed by the amplifiers 8 are used to set fifteen bistable circuits 9 (of which only four are shown in FIG. 1) of a program output staticiser 10. A complete program word read in this manner from the store 1 is thus temporarily stored by the program output staticiser 10, the bistable circuits 9 associated with the sub-words I, $\alpha$ and $\beta$ having previously been re-set by signals supplied over leads W1 and W2.

It is convenient at this point to consider the program store 1 in more detail with reference to FIGS. 12 and 13 of the accompanying drawings. Referring first to FIG. 12, a particular program word is selected by signals representing a five-digit sub-word P that are supplied over a group of ten leads 14 and signals representing a five-digit sub-word Q that are supplied over a group of ten leads 15, the address signals being supplied by the program address staticiser 4 (FIG. 1). Thirty-two gates 16 (of which only four are shown in FIG. 12) are connected to different combinations of the leads 14 so that when a signal is supplied over a lead 17 (by a bistable circuit 18 in FIG. 1) one and only one of the gates 16 is "open" the particular one depending upon the sub-word P. Similarly thirty-two gates 19 (of which only five are shown in the drawing) are connected to different combinations of the leads 15 and again one of these gates is "open" when a signal is supplied over the lead 17. The 1024 address wires 20 (of which only eleven are shown) are each connected between a unique pair of the gates 16 and 19. Thus the arrangement enables a path to be set up through a gate 16, any particular address wire 20 and a gate 19 as a result of the sub-words P and Q stored by the staticiser 4, this particular address wire being energised via a gate 21 by a signal supplied over the lead 6 (FIG. 1).

Referring now also to FIG. 13, the program store 1 comprises 15 ferrite cores 22 each having a "square loop" hysteresis characteristic, each of these cores being associated with one digit of a program word and being arranged to be set to a magnetic state appropriate to the value of that digit. For this purpose there are provided fifteen toroidal magnetic cores 23 each having a somewhat larger aperture than the cores 22, these cores 23 each being operated over the linear part of its hysteresis characteristic. Each of these cores 23 is associated with one of the cores 22 and a closed loop conductor 24 passes through both apertures. The address wires 20 (only one of which is shown in FIG. 13) pass through different combinations of the cores 23 so that, when anyone of these wires is energised, those cores 22 that are associated with cores 23 through which the address wire passes are magnetically set. In other words the magnetic state of the fifteen cores 22 then represent the program word appropriate to the address wire 20 that has been energised and this operation causes signals representing the program word to be supplied as aforesaid over the leads 7. A signal is subsequently supplied over a lead 171 (from a bistable circuit 172 shown in FIG. 1) so as to reset those cores 22 that had previously had their magnetic state changed upon an address wire 20 being energised.

Figure 7:
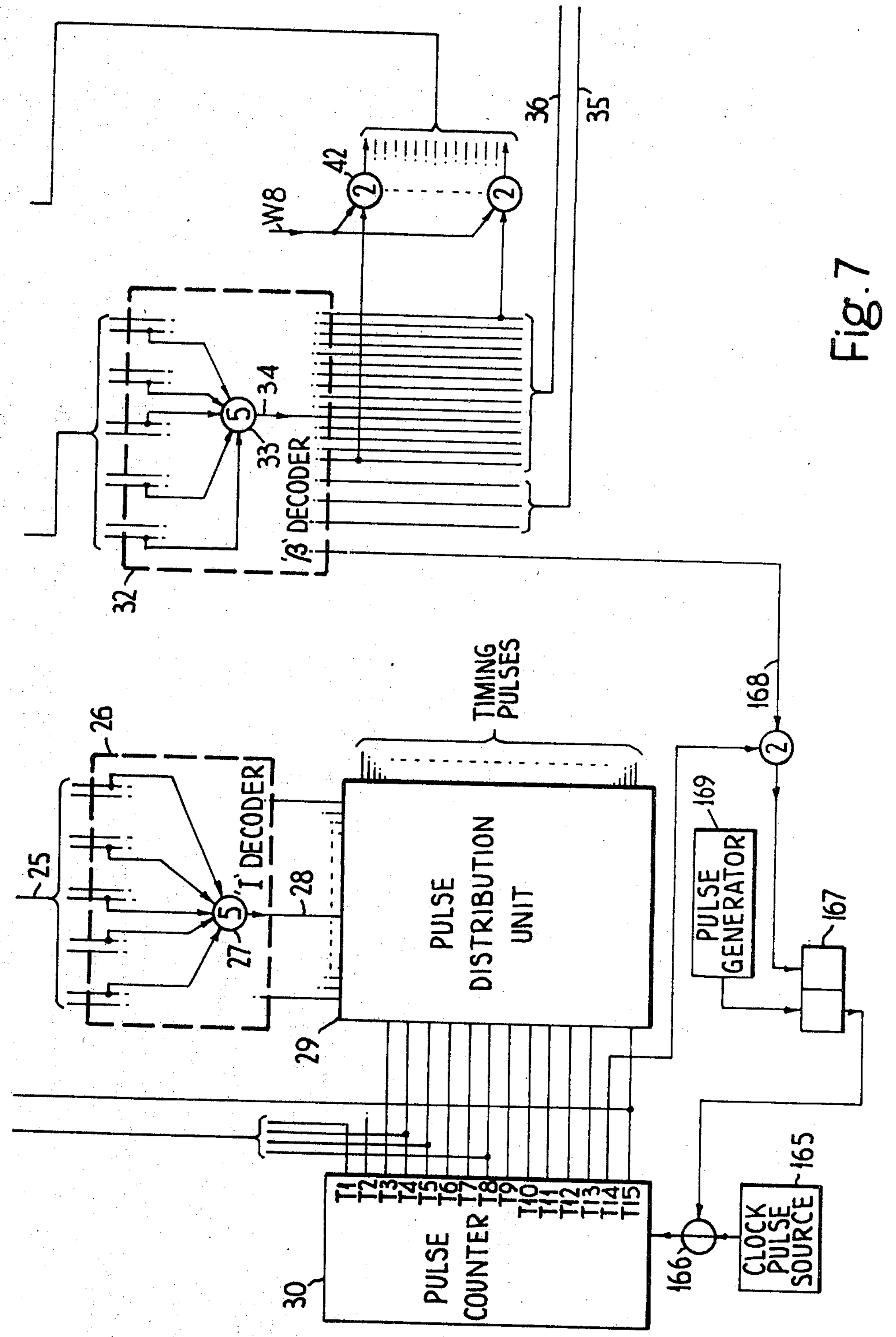

Returning now to consideration of the program output staticiser 10 (FIG. 4), signals representing the sub-word I are passed over a group of leads represented by the line 25 to a decoder 26 (FIG. 7). The decoder 26 comprises a plurality of coincidence gates 27 (only one of which is shown in the drawing) each of which supplies a signal to an associated lead 28 when a particular sub-word I is stored by the staticiser 10. Signals supplied over the leads 28 are passed to a pulse distribution unit 29 which serves to control the distribution of timing pulses supplied by a pulse counter 30 to various items of the register translator as will subsequently be described.

Signals representing the sub-words $\alpha$ and $\beta$ stored by the program output staticiser 10 may be passed in parallel to the highways B and A respectively by way of ten gates 11 upon a timing pulse being supplied to a wire W4.

The staticiser 10 may also temporarily store sub-words $\alpha$ and $\beta$ passed thereto from the highways A and B respectively by way of ten gates 31 upon a timing pulse being supplied to a lead W5.

Signals representing the sub-word $\beta$ stored by the program output staticiser 10 are also passed to a decoder 32 (FIG. 7) which comprises a plurality of coincidence gates 33 (only one of which is shown in the drawing) each of which supplies a signal to an associated lead 34 when a particular sub-word $\beta$ is stored by the staticiser 10. The signals on three of the leads 34 which are collectively represented by a line 35 are utilised as will subsequently be apparent to select the three highways A, B and C respectively while signals on fifteen leads 34 which are collectively represented by line 36 are similarly used to select particular highway wires A1 to A5, B1 to B5 and C1 to C5. In particular a timing pulse supplied over a lead W8 may be passed to any one of the highway wires A1 to C5 by way of one of fifteen gates 42 as selected by a signal on one of these fifteen leads 34.

As previously mentioned the program store 1 is addressed by signals supplied by the program address staticiser 4 which comprises ten bistable circuits 37 each of which is arranged to store one digit of the sub-words P and Q. The five bistable circuits 37 associated with sub-word P are initially reset by a timing pulse supplied through a gate 38 from a lead W6 or a lead 112 and may then be set (upon the occurrence of a timing pulse supplied over a lead W50 or a lead 111) to store a sub-word P by signals supplied by the highway A by way of five gates 39. Similarly the bistable circuits 37 associated with the sub-word Q are initially reset via a gate 40 by a timing pulse supplied over a lead W7 (if a signal is present on a lead 123) or the lead 112 and may then be set (by a timing pulse supplied over a lead W51 or the lead 111) to store a sub-word Q by signals supplied from the highway B via five gates 41. Pulses representing sub-words P and Q stored by the program address staticiser 4 may also be passed to the highways A and B respectively by way of ten gates 43 upon the occurrence of a timing pulse on a lead W9.

The register store 2 (FIG. 2) effectively comprises sixty-four stores which are associated respectively with sixty-four separate "registers" and each of these separate stores is capable of storing up to fourteen words each of fifteen binary digits. The register store 2 has a three-dimensional array of 28 by 32 by 15 ferrite cores. FIG. 14 of the accompanying drawings shown diagrammatically a perspective view of this array and 28 by 15 cores that lie in each of thirty-two planes parallel to the lines OX and OZ provide a pair of said "registers." The cores of this array are threaded by twenty-eight "X" wires each of which passes through all the 32 and 15 cores in a plane parallel to the OY and OZ lines and by thirty-two "Y" wires each of which passes through all the 28 by 15 cores in a plane parallel to the OX and OZ lines. Thus any group of fifteen cores that are associated with a particular register word are all threaded by a unique combination of one "X" wire and one "Y" wire. In addition, all the 32 by 28 cores lying in each of fifteen planes parallel to the OK and OY lines are threaded by a sense wire 44 and an inhibit wire 45.

Referring again to FIG. 2, the particular "register" of the register store 2 that is to be addressed at any time is determined by signals supplied by a register address staticiser 46. In fact the staticiser 46 is arranged to store six binary digits on five bistable circuits 47 and a further bistable circuit 48. A particular word within a "register" is selected by means of signals supplied over a group of leads represented by the line 49 in respect of four of the digits of a sub-word $\alpha$ stored by the program output staticiser 10.

Referring now to FIG. 15, twenty-eight gates 50 (only two of which are shown in the drawing) are connected to different combinations of the leads 51 (from the program output staticiser 10) and the leads 52 that are connected to the bistable circuit 48 of the register address staticiser 46 so that when a signal is supplied over a lead 53 (by a bistable circuit 54 in FIG. 2) one and only one of the gates 50 is "open." Similarly thirty-two gates 55 are connected to different combinations of the leads 56 (from the bistable circuits 47 of the register address staticiser 46) and again only one of these gates is "open" when a signal is supplied over the lead 53.

When a word stored by the register store 2 is to be read, one gate 50 and one gate 55 are caused to be "open" in the manner described in that the last paragraph and a "read" signal is then supplied by a bistable circuit 56 (FIG. 2) over a lead 57. This causes an "X driver" circuit 58 and a "Y driver" circuit 59 to supply current through the gates 50 and 55 that are "open" with the result that any of the register store cores that had previously been set to a magnetic state corresponding to the digit value "1" are reset to the magnetic state corresponding to the digit value "0." When any cores are reset in this way signals are supplied over the appropriate sense wires 44 to sense amplifiers 60 (FIG. 2) which are usually turned on at this time by signals supplied over a lead 61 by a bistable circuit 62. Signals passed by the amplifiers 60 are used to set fifteen bistable circuits 63A, B and C of a register output staticiser 64, these bistable circuits being assumed to have previously been reset, so that the staticiser 64 then stores the word read from the register store 2. It is convenient to mention here that the digits stored by the five bistable circuits 63A, the five circuits 63B and the five circuits 63C of the staticiser 64 are subsequently referred to as sub-words A, B and C respectively.

It will be appreciated from the above that the register store 2 is of the destructive read-out type. For the purpose of writing a word stored by the register output staticiser 64 into a word location of the register store 2, as specified by a pair of gates 50 and 55 being "open" as previously described, a signal is supplied by a bistable circuit 65 to the driver circuits 58 and 59 by way of a lead 66 and the circuits 58 and 59 cause current to flow through the selected "X" and "Y" wires in the opposite direction to that during reading. Each inhibit wire 45 has an associated drive circuit 162 which is rendered operative by the coincidence of a signal on the lead 66 and a signal supplied by the staticiser 64 to signify that the appropriate digit stored thereby has the value "0." Thus, only those cores of the selected word that are required to store the digit value "1" have their magnetic states changed by the simultaneous excitation of the appropriate "X" and "Y" wires.

Signals representing sub-words A, B and C stored by the register output staticiser 64 may be passed to the highway A, B and C respectively by way of gates 65 upon a timing pulse being supplied to lead W10.

The bistable circuits 63A, B and C may be all reset by a timing pulse passed thereto through gates 163 from a lead W11. Alternatively only the bistable circuit 63A, 63B or 63C may be reset by a timing pulse supplied to a lead W12, the particular bistable circuits that are reset depending upon which of the three gates 67 has a signal supplied thereto by the decoder 32 (FIG. 7).

Any one of the bistable circuits 63A, B and C of the register output staticiser 64 that is storing the digit value "1" may be changed to the digit value "0" by the simultaneous occurrence of a signal on the appropriate wire of the highway A, B or C and a timing pulse supplied to a lead W13 as determined by a gate 68. (This operation is referred to hereinafter as "erasing" a digit.)

When the bistable circuit 63A, B and C of the staticiser 64 have been reset, signals representing sub-words A, B and C may be passed through gates 69 upon the occurrence of a timing pulse supplied to a lead W14 so that those sub-words are then stored by the staticiser 64. A word written into the staticiser 64 in this manner may subsequently be written into the register store 2 in the manner previously described. Alternatively signals on one of the highways A, B or C may be passed to the staticiser 64 for the purpose of setting the appropriate bistable 61, 62 or 63 by a timing pulse supplied through one of three gates 70 from a lead W15, the particular gate 70 being selected by a signal supplied by the decoder 32.

The five bistable circuits 47 of the register address staticiser 46 may be set by signals supplied from the highway A by way of gates 90 upon the occurrence of a timing pulse on lead W16 while the bistable circuit 48 is set by a signal supplied from highway wire B5 via gate 91 when a signal is supplied over lead 92. Signals representing a register address stored by the staticiser 46 may be passed to the highway wires A1 to A5 and B5 by way of six gates 93 (FIG. 6) upon a timing pulse being supplied thereto over a lead W17. The circuits 47 and 48 are respectively reset by timing pulses on leads W64 and W65.

The information required for any possible translation that may be effected by the register translator is stored by the translator store 3 as a word of seventy-one binary digits. The particular translator word that is to be read at any time is determined by two five-digit sub-words stored by bistable circuits 71A and 71B respectively of a translator address staticiser 72. The register translator is only capable of handling a maximum of five digits read at any time from the translator store 3 and the required group of four or five digits of a translation word is determined by a five-digit sub-word stored by bistable circuits 71C of the staticiser 72.

Referring now to FIG. 16, the translator store 3 has several hundred address wires 73 (only some of which are shown in the drawing) each of which is associated with one translation word. As far as energisation of an address wire 73 is concerned, the circuit of FIG. 15 is essentially similar to that of FIG. 12 of the program store 1. It is therefore sufficient to say that when a signal is supplied over a lead 74 from a bistable circuit 75 a path is set up through one of the gates 76, the required address wire 73 and one of the gates 77 as a result of the relevant sub-words stored by the translator address staticiser 72.

The translator store 3 has seventy-one "square loop" ferrite cores 78 (FIG. 17) each of which is coupled by a closed loop conductor to a "linear" core in the same way as in the program store 1. The address wires 73 pass through different combinations of these "linear" cores. Thus when an address wire 73 is energised via a gate upon a signal being supplied thereto from a bistable circuit 81 (FIG. 3) over a lead 80, the seventy-one cores 78 are set to store the relevant translation word.

Figure 3:
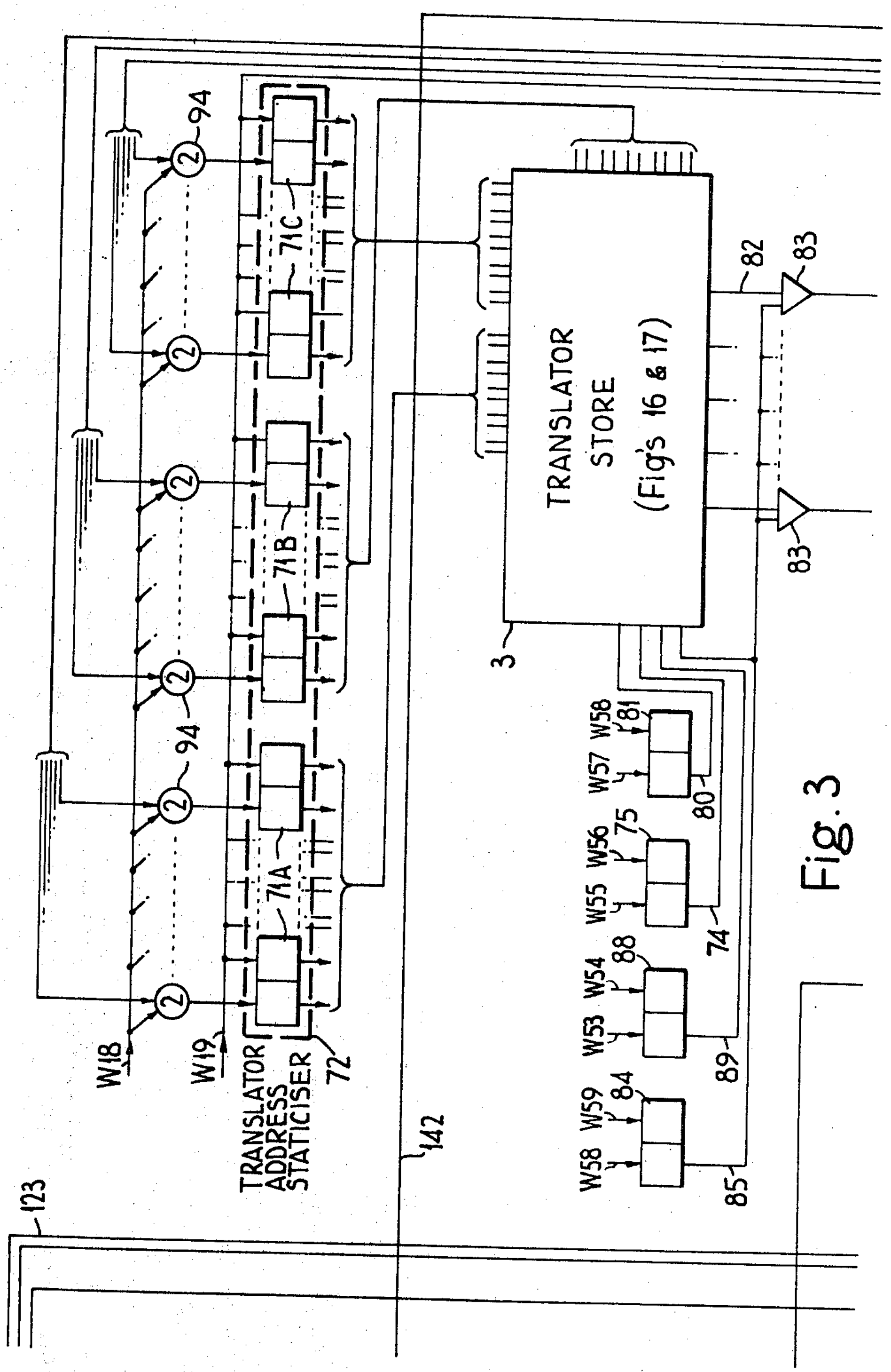

Referring now to FIG. 17, five output leads 82 of the translator store 3 thread different combinations of the cores 78 and are connected to amplifiers 83 (FIG. 3). A bistable circuit 84 (also FIG. 3) is arranged to supply a signal over lead 85 to turn on the amplifiers 83 and at the same time to pass a "read" signal through one of a group of gates 86 (as determined by the sub-word stored by the bistable circuits 71C of the staticiser 72 to one of the group of leads 87. Such a read signal causes those cores 78 of the appropriate sub-word of the translator word stored thereby that had previously been set to the magnetic state corresponding to the digit value "1" to be reset to the state corresponding to the digit value "0" with the result that signals are supplied over the appropriate lead 82 to the amplifiers 83.

All the cores 78 of the translator store 3 may be reset by a signal supplied by another bistable circuit 88 over a lead 89.

The translator address staticiser 72 may be set to store sub-words A, B and C by signals supplied thereto from the highways A, B and C respectively by way of fifteen gates 94 upon the application of a timing pulse to a lead W18.

Signals supplied by the amplifiers 83 in respect of a sub-word read from the translator store 3 are utilised to set five bistable circuits 95 of a translator output staticiser 96. Gates 97, 98 and 99 are arranged to pass signals representing such a sub-word stored by the staticiser 96 to the highway A, B or C when a timing pulse is supplied over a lead W60 and a signal supplied by the decoder 32 over the trio of leads represented by the line 35. The bistable circuits 71A, 71B and 71C of the staticiser 72 and the bistable circuits 95 of the staticiser 96 may all be reset by a timing pulse supplied over a lead W19.

Figure 8:
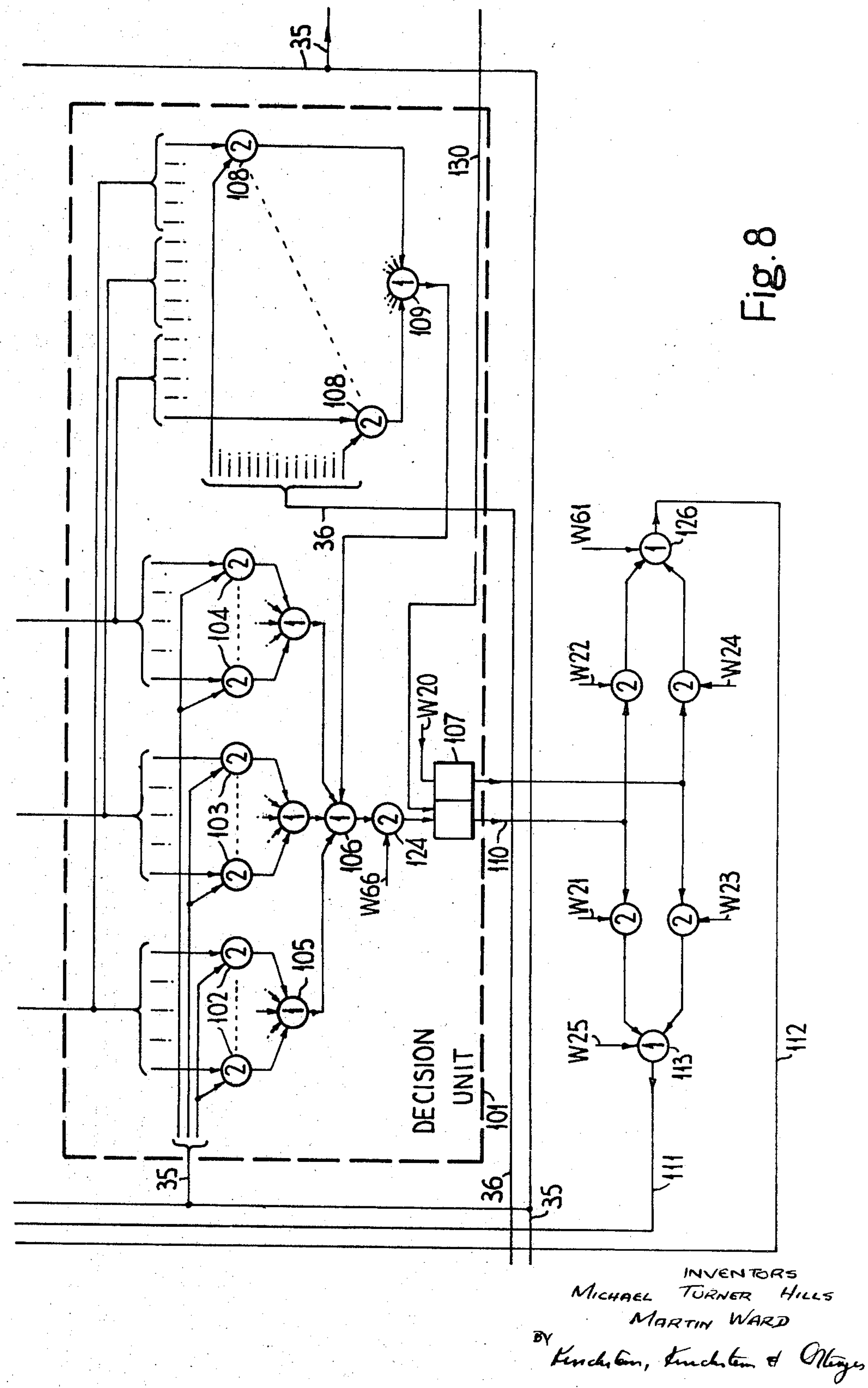

Referring now to FIG. 8 of the drawings, a decision unit 101 is arranged to determine whether signals on any selected one of the highways A, B and C all represent the digit value "0" or whether the signal on any individual highway wire represents the digit value "0." When the unit 101 is required to respond to signals on the highway A (or highway B or C), a signal is supplied by the decoder 32 over the appropriate lead of the trio represented by the line 35 so that any signals on the highway A (or B or C) having the digit value "1" are passed by gates 102 (or gates 103 or 104). Upon the occurrence of a timing pulse supplied over lead W66, any signals passed by the gates 102 (or 103 or 104) are passed through gates 105, 106 and 124 to set a bistable circuit 107 (which at this time may be assumed previously to have been reset to its other stable state by a timing pulse supplied over a lead W20). Similarly a signal on one of the fifteen wires represented by the line 36 selects an individual highway wire so that a signal representing the digit value "1" on that wire is passed through one of the gates 108, the gate 109, and the gates 106 and 124 to set the bistable circuit 107.

When the bistable circuit 107 has been set in the manner described in the last paragraph (indicating that the group of digits being inspected do not all have the digit value "0" or that the individual digit being inspected does not have that value) a signal is supplied over a lead 110. Such a signal enables timing pulses supplied over leads W21 and W22 to be passed to leads 111 and 112 respectively. Similarly if the bistable circuit 107 had not been so set timing pulses supplied to leads W23 and W24 may be passed to the leads 111 and 112 respectively. Timing pulses supplied over leads W25 and W61 are also passed respectively to the leads 111 and 112 by way of the gates 113 and 126. (It may be mentioned here that the program address staticiser 4 (FIG. 1) is reset by pulses passed by the gates 38 and 40 when a signal is present on the lead 112 as just described. Furthermore a timing pulse on the lead 111 is supplied by way of gates 127 and 128 to the gates 39 and 41 to cause signals on the highways A and B to be passed to the program address staticiser 4 to enable a new program address to be stored by that staticiser.

Figure 9:
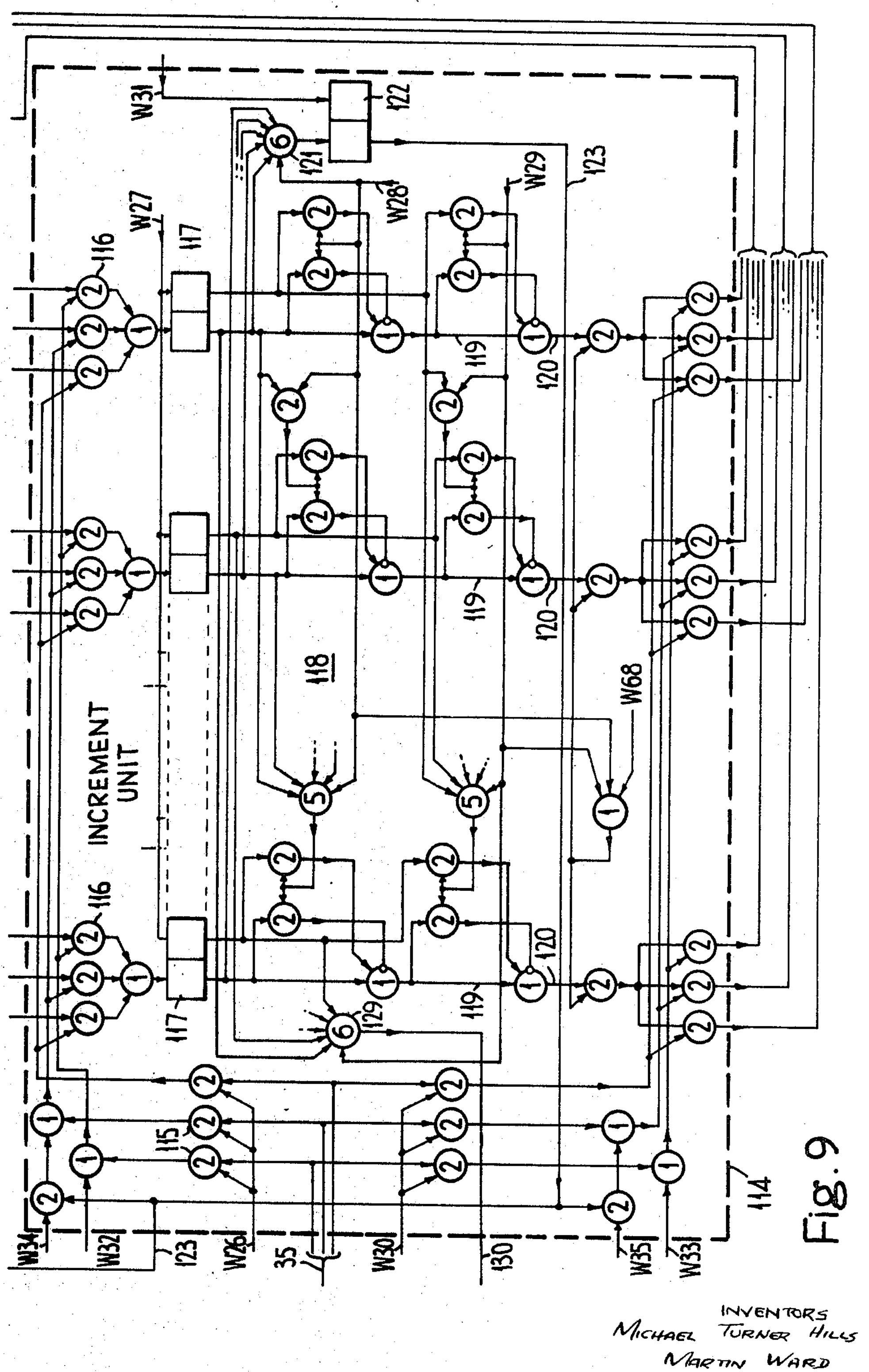

Referring now particularly to FIG. 9 of the accompanying drawings, an increment unit 114 is arranged essentially to add (or substract) "1" to the five-digit binary number represented by signals passed thereto from one of the highways A, B and C. The particular highway may again be identified by a signal on one of the trio of leads represented by the line 35 and a timing pulse supplied over lead W26 is then utilised by way of one of the gates 115 and five gates 116 (only some of which are shown) to set the appropriate ones of five bistable circuits 117 (which may be assumed at this time to have been previously reset by a timing pulse supplied over a lead W27). The circuits 117 are thus caused temporarily to store a sub-word transferred thereto from the appropriate highway. "1" is added to the binary number of the sub-word stored by the circuits 117 by supplying a timing pulse over a lead W28 and the arrangement of gates 118 ensure that signals representing the incremented number (with the appropriate carry from digit to digit) is represented by signals on the leads 119. Similarly "1" may be subtracted from the number stored by the circuits 117 by supplying a timing pulse over a lead W29.

Signals supplied over the leads 120 which may represent the unincremented number stored by the bistable circuits 117 (upon the occurrence of a timing pulse or lead W68) or that number incremented by the addition or subtraction of "1" as just described, may be passed back to the appropriate highway as determined by a signal on one of the trio of leads represented by the line 35 upon a timing signal being supplied over a lead W30.

It will be appreciated that if the number stored by the bistable circuits 117 of the increment unit 114 is "11111," the effect of adding "1" is to produce the number "00000" and this condition is detected by a coincidence gate 121. When this condition is detected the gate 121 supplies a signal to a bistable circuit 122 so as to set it to a particular state which causes a signal to be supplied over the lead 123. The bistable circuit 122 is reset to its other state by a timing pulse supplied over a lead W31.

In one mode of operation, the increment unit 114 is used for incrementing the program store address. For this purpose, a sub-word P is transferred from the highway A to the bistable circuits 117 by a timing pulse supplied over a lead W32, the word is then incremented by the addition of "1" and read back to the highway A by a timing pulse supplied over a lead W33. Subsequently if the result of incrementing P in this way has caused the bistable circuit 122 to supply a signal over the lead 123, a timing pulse supplied over a lead W34 causes sub-word Q to be passed from the highway B to the bistable circuits 117 and this sub-word is then incremented by the addition of "1" and signals representing the incremented sub-words are passed back to the highway B upon the occurrence of a timing pulse supplied over a lead W35. (A signal supplied in this manner over the lead 123 also enables timing pulses to be passed through the gates 125 and 131 (FIGS. 1 and 2) for the purpose of changing the sub-word Q stored by the program address staticiser 4.) Thus the sub-word Q is only incremented when the sub-word P has the value "00000."

In the same way that the gate 121 detects the condition that the result of adding "1" to the number stored by the bistable circuits 117 of the increment unit 114 is "00000," a gate 129 detects the condition that the result of subtracting "1" from the number stored by the circuits 117 is "00000." A signal passed by the gate 129 is fed over a lead 130 to set the bistable circuit 107 (FIG. 8).

Figure 10:
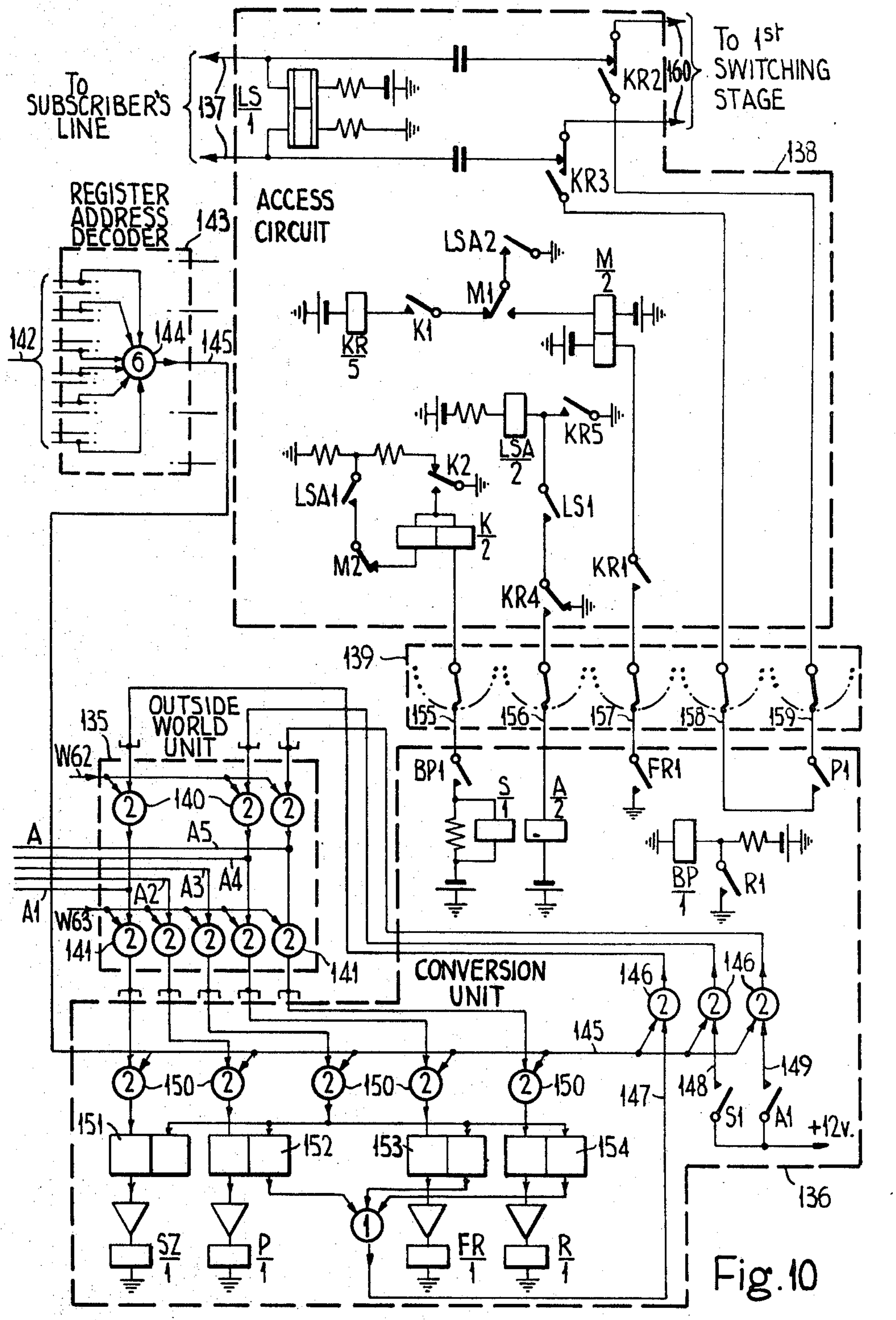

Referring now particularly to FIG. 10, the register translator also includes sixty-four conversion units 136 (only one of which is shown in the drawing) which are associated one with each "register" of the register store 2 and which are arranged to be connected to the highway A by way of an "outside world" unit 135. Connection between a pair of line wires 137 that are connected to a subscriber and a conversion unit 136 is effected by way of an access circuit 138 and a uniselector switch 139. (The switch 139 is operated when an access circuit 136 is to be connected to the register translator, to hunt for a free conversion unit 136 but since it forms no part of the present invention it will not be further described herein.)

The outside world unit 135 comprises three gates 140 which are arranged to pass signals supplied by any conversion unit 136 to the highway wires A1, A4 and A5 respectively upon the occurrence of a timing pulse over a lead W62. Similarly five gates 141 are arranged to pass signals from the highway wires A1 to A5 respectively to all the conversion units 136 when a timing pulse is supplied over a lead W63.

Each conversion unit 136 is addressed in turn by signals supplied by the register address staticiser 46 (FIG. 2) over the group of leads represented by the line 142. For this purpose there is provided a register address decoder 143 which comprises a plurality of coincidence gates 144 each of which supplies a signal over an associated lead 145 when the conversion unit 136 associated with the appropriate "register" is addressed.

Considering now the conversion unit 136 of FIG. 10, a signal on the lead 145 causes gates 146 to pass signals on leads 147, 148 and 149 to the outside world unit 135 while gates 150 are caused to pass signals supplied by the outside world unit 135 to four bistable circuits 151 to 154. In fact the circuits 151 to 154 are arranged to be triggered to a particular state by pulses supplied thereto from highway wires A1, A2, A4 and A5 through gates 141 and 150 while those circuits are reset by pulses similarly supplied from the highway wire A3. Electromagnetic relays SZ, P, FR and R are respectively associated with the bistable circuits 151 to 154, each of these relays being operated when the associated bistable circuit is in the particular state mentioned in the last sentence.

It is convenient now to consider the operation of the access circuit 138. When the line wires 137 are looped, to indicate that a subscriber requires access to the register translator, a relay LS is operated. This completes a circuit through contacts LS1 and contacts KR4 to operate a relay LSA. Closure of contacts LSA1 completes a circuit through contacts M2 and the operating windings of a relay K to a lead 155 from the conversion unit 136 which at this time is maintained at a negative potential. The relay K is therefore operated. (The flow of current through the resistor 156 causes a relay S to be operated with the result that the contacts S1 are closed so that a signal is then supplied to the lead 148 for the purpose of signalling to the highway A, when the conversion unit 136 is addressed, that the conversion unit (and its associated "register") is in use.)

Upon operation of the relay K, closure of contacts K1 completes a circuit through normally open contacts M1 and contacts LSA2, relay LSA being operated at this time, so as to operate relay KR. Contacts K2 complete a holding circuit for the relay K.

Operation of the relay KR causes leads 156 and 157 from the conversion unit 136 to be extended via contacts KR4 and KR1 respectively while contacts KR2 and KR3 connect outgoing leads 158 and 159 of the conversion unit 136 to a pair of leads 160 that are connected to the first switching stage (not shown) of an exchange of the telephone system. Contacts KR5 complete a holding circuit for the relay LSA.

It will be appreciated from the above that the relay A in the conversion unit 136 is operated at this time, the operating circuit for this relay being set up through contacts KR4, LS1 and KR5. Accordingly the contacts A1 are closed to enable a signal to be passed through gates 141 and 140 to the highway wire A5. When, however, the subscriber commences impulsing for the purpose of signalling the exchange and number of a wanted subscriber, each impulse causes the relay LS to release and this in time causes the relay A to release so that the impulses are repeated (at the appropriate times determined by signals on leads 145 and W62) to the highway A.

Impulsing out from the register translator is effected by the relay P, contacts P1 thereof serving to provide a connection between the leads 158 and 159 so as to loop the pair of leads 160 and thereby pass output impulses from the register translator on to the first and subsequent switching stages.

At the end of a normal translation sequence, the register translator causes the relay R to operate and this in turn releases the relay BP so as to interrupt the holding circuit for the relay K. Release of the relay K causes the relays KR and LSA also to release. Return of the contacts KR2 and KR3 to their normal positions, reconnects the line wires 133 to the pair of leads 160 that are connected to the first switching stage.

Under certain conditions, for example if a subscriber does not commence dialling with a predetermined period after obtaining access to the register translator, a "forced release" sequence of the translator is brought into operation. This causes the relay SZ to operate. It may be mentioned here that FIG. 10 is a somewhat simplified representation of the access circuit to show only the items essential to give understanding of the present invention; in particular contacts of the relay SZ that interrupt the supply of dial tone to the subscribed at this time have been omitted. Subsequently the relay FR is operated and the result of earthing the lead 157 by way of contacts FR1 is to complete an operating circuit for a relay M which is then held operated by the circuit that is completed over contacts LSA2 and M1. This in turn causes the relays KR, K and LSA to release.

It is convenient now to consider the organization of the translator store 3. The organization can be considered as a tree and an example of a typical small translator tree is shown in FIG. 18. In this figure, each impulse of the first train of impulses characterising a called subscriber has the effect of stepping one line down the vertical "branch" shown at the top left hand corner. If then there is an inter-train pause, say after the fourth impulse, it is necessary to move along a "link" (represented by the line 190) to a second branch associated with the second input train of impulses. Again each impulse of this train results in movement down the said branch and so on. In practice not all the "locations" on a tree of this nature are utilised and in the example shown the unused or "spare" locations are marked S while the locations that are required to result in a translation are marked T. It will be noted that a translation may be required in response to only a single input train of impulses (for example the decimal code "0" in the example shown), after two input trains (for example the code "82") or after three input trains (for example the code "493").

It will be appreciated that at many locations on the tree of FIG. 18 the next movement may either be to the next location on the same branch or by way of a link to another branch.

During use of the register translator under consideration the storage location (identified by the sub-words stored by the bistable circuits 71A and 71B of the translator address staticiser 72) in the translator store 3 associated with any particular "register" is changed in response to each impulse of the input trains of impulses that characterise the called subscriber's exchange. Furthermore the information stored at each of these locations gives the address ($L_1$) of the next storage location if in the same branch and the address ($L_2$) of the next storage location if in another branch. The possible storage locations to give the same translations as part of the tree of FIG. 18 are shown in FIG. 19, the numbers by which the storage locations are designated being quite arbitrary.

It will be appreciated that in the arrangement of storage locations just considered, full use is not made of many of them since there is no possible link to another branch. Use is made of this fact in the translator store 3 in that the information stored at each location includes the number of impulses that must be received before application need be made again to the translator store.

The consequential reduction in the number of storage locations in the translator store 3 will be seen from FIG. 20 which shows the storage locations that are now required to replace the left-hand branch of FIG. 19. With the arrangement of FIG. 20, the information stored at each storage location includes the following:

Digit A—Whether location is associated with a translation or with a link

Digits B—Number of impulses before application need be made to the translator store 3 if the next location is in the same branch Digits C—Address of next storage location in the same branch Digits D—Number of impulses before application need be made to the translator store 3 if the next location is in a linked branch Digits E—Address of next storage location in the linked branch.

It may be mentioned here that the seventy-one digits of the word stored at each location of the translator store 3 carry the following information:

DIGIT(S)

1—Digit A (A=1 for translation and A=0 for link)

2 to 5—Digits B (Digits 1 to 5 form one group)

6 to 15 (Two groups)—Digits C

16 to 19 (One group)—Digits D or, if the storage location is associated with a translation (i.e. there is no linked branch from that location), the number of routing digits that are to be impulsed-out as a result of the translation

20 to 29 (Two groups)—Digits E or, if the storage location is associated with a translation, information concerning the type of call (for example local, S.T.D. etc.)

30 to 33 (One group)—First decimal routing digit (R1)

34 to 37 (One group)—Second decimal routing digit (R2)

* * * * *

58 to 61 (One group)—Eighth decimal routing digit (R8)

62 to 71 (Two groups)—Alternate route address (AR i.e. the address of a new storage location in the translator store 3. This is only utilised when it is not possible to set up a call over the route indicated by the eight routing digits of the original translation word.)

Considering now the operation of the register translator, each individual "register" of the register store 2 is arranged to store information in respect of the input address of the storage location of the translator store 3 that is characteristic of the input trains of impulses that have been received. Once during every eleven milliseconds each of these "registers" is associated with the appropriate conversion unit 136 and the information stored by the "register" is up-dated in dependence upon there being either an input impulse or no impulse as determined by the state of the relay A. This up-dating involves a number of sub-programs each of which is brought about by an instruction sub-word I. The effect of this is that each "register" does not have a fixed period of time allocated to it on a cyclic basis although on average each "register" has approximately 160 microseconds before the translator moves on to the next "register." The logical operations involved in each sub-program last twelve microseconds and timing pulses (which are subsequently identified as timing pulses T1 to T15) supplied by the pulse distribution unit 29 may occur at any one of fifteen instants within such an interval.

For the purpose of deriving the timing pulses T1 to T15, a pulse source 165 supplies a train of clock pulses having a repetition frequency of 1.25 megacycles per second to the pulse counter 30 (FIG. 7) by way of a gate 166. A bistable circuit 167 normally supplies a signal to the gate 166 so as to cause that gate to be "open." As will subsequently be described, the circuit 167 is triggered to its other state, when all the "registers" have been up-dated, by a signal supplied by the decoder 32 over a lead 168. The bistable circuit 167 is subsequently reset to its normal state by a pulse of a train of pulses having a repetition period of about eleven milliseconds.

The translator is also arranged so that, when any "register" has received sufficient information (i.e. has responded to all the appropriate input trains of impulses) to characterise uniquely the exchange of a called subscriber, it performs the required translation and supplies the required output trains of impulses. Such "impulsing-out" is performed within each period allocated to a "register" as aforesaid after the "register" has been up-dated in response to incoming information. Similarly the numerical digits that are represented by the input trains of impulses characterising the number of a called subscriber are stored in a "register" and are subsequently impulsed-out again as output trains of impulses that follow those characterising the route to the called subscriber's exchange.

The arrangement of data stored by each of said "register" is shown in FIG. 21, it being noted that the data is in the form of fourteen words each of fifteen digits and these words each being divided into three five-digit sub-words A, B and C. The information stored on sub-words A and B of Word 1 is in respect of the state of call as far as impulsing-in is concerned and is subsequently referred to as "State of Call 'A'" (or SOC A with the addition of a numerical suffix to identify a particular state). State of Call "A" is utilised to control the sub-programs that are to be performed the next time the "register" is up-dated. Similarly the State of Call "B" (or SOC B) in Word 2 is information in respect of the state of call as far as impulsing-out is concerned.

The "Dialling-in Index" of Word 3 is the address (in Words 9 to 14) of the digit that is currently being up-dated in the "register" by an input train of impulses. Sub-word C of this word is utilised during impulsing-out to indicate the number of the particular output train of routing impulses that is currently being impulsed-out. (Initially this sub-word stores the total number of routing digits obtained from the translation word and this number is reduced by one as each digit is impulsed-out.)

Digit A (as defined above) is stored as digit 15 of Word 4. The information stored as the rest of Sub-word C of Word 4 is in respect of either the digits B (or D) (before a translation location has been reached in the translator store 3) or (after such a location has been reached) in respect of the type of call (as previously mentioned). Sub-words A and B of this word are utilised to store the digits C (or E) identifying the next location in the register store 3 and subsequently to store an "Impulsing-out Index" which is the address of the particular digit (in Words 9 to 14) that is currently being impulsed-out.

The whole of Word 5 is utilised in connection with an operation to measure the period of time during which no input train of impulses is received; initially a predetermined binary number is stored at this location and this number is reduced by one each time the "register" is brought into use provided there is no input impulse, when the number is reduced to zero (say after approximately twenty seconds) release of the "register" and its associated conversion unit 136 is forced. Sub-words A and B are also utilised for timing a period for the purpose of identifying an inter-train pause during impulsing-in and also for timing a period of four seconds to determine the end of dialling. Sub-word C is also utilised for timing a further period at the end of which there is a release in the event of a call being abandoned during impulsing-in.

Sub-words A and B of Word 6 are utilised for timing the period of inter-train pauses during impulsing-out.

Sub-word A of Word 7 is utilised for timing the period (66 milliseconds) of each "break" between impulses during impulsing-out. Sub-word B stores information as to the total number of digits, that is to say input trains of impulses, to which the register has responded. (Since the total number of digits to be impulsed-in is dependent upon the type of call, the actual number is utilised to control when the end-of-dialling period is to be timed rather than the period for forced release as previously discussed.) Sub-word C of this word stores information in respect of the difference at any time between the number of numerical digits impulsed-in to the register and the number of numerical digits impulsed-out. (Since impulsing-in and impulsing-out may occur contemporaneously, this difference may be reduced to zero before all the numerical digits have been impulsed-in and this information in Sub-word C is utilised to cause the equipment to wait in such circumstances.)

Sub-words A and B of Word 8 identify an input address of the translator store 3, that is to say the address of a storage location, while Sub-word C identifies a particular four or five digit group within the translator word as previously discussed.

Finally Words 9 to 14 provide storage for up to sixteen decimal digits, each of these digits being dialled-in as an input train of impulses. It will be appreciated that some of these digits are input routing digits while others are numerical digits that are subsequently impulsed-out as an output trains of impulses.

Before describing the operation of the register translator as a whole, mention will now be made of the various sub-programs which are used in the register translator and which are specified by sub-words I. Details of these sub-programs are given below:

(1) ADD "1"

Read from the register store 2 a word specified by the program sub-word $\alpha$ and transfer this word to the register output staticiser 64. Pass signals representing five digits of sub-word A, B or C of this word (as specified by a signal supplied by the decoder 32 in dependence upon the program sub-word B) to the increment unit 114. Cause the increment unit 114 to add "1" to the binary number represented by the five digits passed thereto. Gate signals representing the incremented number back to the appropriate section of the staticiser 64. Write a word then stored by the staticiser 64 back into the register store (at the word location still indicated by the program sub-word $\alpha$).

Gate signals representing the sub-word P from the program address staticiser 4 to the increment unit 114. Cause the increment unit 114 to add "1" to the binary number represented by the digits of the sub-word P. Pass signals representing the incremented sub-word P from the increment unit 114 back to the appropriate section of the staticiser 4. If the number represented by the sub-word P is now zero (as indicated by state of the bistable circuit 122 in the unit 114) pass signals representing the sub-word Q from the staticiser 4 to the increment unit 114. Cause the increment unit 114 to add "1" to the number stored thereby and pass signals representing the incremented number back to the appropriate section of the staticiser 4.

(The operations set out in the last paragraph are subsequently referred to as "step P/Q." It will be appreciated that by repeating step P/Q the staticiser 4 would cyclically take up conditions corresponding to all the addresses of the program store 1.)

(2) SUBTRACT "1" AND INTERROGATE FOR ZERO

As for instruction (1) above except that the increment unit 114 is instructed to subtract "1" from the number represented by the sub-word A, B or C passed thereto from the staticiser 64. If the sub-word just operated on has gone to zero, pass a signal over lead 130 to the decision unit 101 and set the bistable circuit 107.

(3) INTERROGATE

Read from the register store 2 a word specified by the program sub-word $\alpha$ and store this word in the staticiser 64. Supply signals representing the word so stored to the highways A, B and C and cause the decision unit 101 to respond to the signal on one of the highway wires (as specified by a signal supplied by the decoder 32 in dependence upon the program sub-word $\beta$). Rewrite the word stored by the staticiser 64 back into the register store 2. Step P/Q.

(4) WRITE A "1"

Read a word from the register store 2 into the staticiser 64 as previously. Pass a signal supplied by the decoder 32 (as specified by the program sub-word $\beta$) via gates 42 and 69 to set one of the bistable circuits 63A, B or C of the staticiser 64. Write the word then stored by the staticiser 64 back into the register store 2. Step P/Q.

(5) ERASE A "1" OR A SUB-WORD A, B OR C

As for instruction (4) above except that the appropriate highway wire is connected to the relevant bistable circuit 63A, B or C by way of one of the gates 68.

Alternatively if the program sub-word $\beta$ specifies a sub-word A, B or C, all the bistable circuits 63A, 63B or 63C associated with that sub-word are reset.

(6) ADDRESS THE TRANSLATOR STORE 3

Read a word from the register store 2 into the staticiser 64 as previously. Pass signals from the staticiser 64 to the translator address staticiser 72 so that sub-words A, B and C are stored thereby. Rewrite the word stored by the staticiser 64 back into the register store 2 and step P/Q.

(7) TRANSLATE

Reset staticiser 64. Read a word from the register store 2 into the staticiser 64 as previously. Read the five digits of a translation word (as selected by instruction (6)) into the translation output staticiser 96. Reset bistable circuit 63A, B or C of staticiser 64 (as specified by program subword $\beta$) and pass signals from staticiser 96 to those circuits to cause new sub-word A, B or C to be stored by the staticiser 64. Write the word then stored by the staticiser 64 into the register store 2 and step P/Q.

(8) SET INDEX

Read a word from the register store 2 into the staticiser 64 as previously. Rewrite this word into the register store 2 but do not reset the staticiser 64. (In other sub-programs the staticiser 64 is reset at this time.) Pass signals from the staticiser 64 to the program output staticiser 10 so as to cause it to store sub-words $\alpha$ and $\beta$ that had been read from the store 2 and step P/Q.

(The program word read from the program store 1 following this step P/Q must be one in which the sub-words $\alpha$ and $\beta$ are digitally all zeros. The $\alpha$ and $\beta$ information is then taken from that fed into staticiser 10 during sub-program (8).)

(9) REPLACE A WORD

Read a word from the register store 2 but do not turn on the amplifiers 60 so that the word read is not stored by the staticiser 64. Write the word previously stored by the staticiser 64 into the appropriate storage location in the register store 2. Step P/Q.

(If the staticiser 64 had previously been reset so that all the digits stored thereby are zeros, this sub-program can be used to delete a word in the register store 2.)

(10) TRANSFER SUB-WORD TO INCREMENT UNIT 114

Read a word from the register store 2 into staticiser 64 as previously and step P/Q. Pass to increment unit 114 signals representing one of the sub-words stored by the staticiser 64 (as specified by the program sub-word $\beta$ stored by the staticiser 4) to cause the sub-word to be stored by the bistable circuits 117. Rewrite the word stored by the staticiser 64 into the register store 2.

(11) TRANSFER SUB-WORD FROM INCREMENT UNIT 114

Read a word from the register store circuit into the staticiser 64 as previously. Gate signals supplied by the bistable circuits 117 of the increment unit 114 to the bistable circuits 63A, B or C (as specified by program sub-word $\beta$) of the staticiser 64 so that one of the sub-words stored by the staticiser 64 is replaced. Write the word then stored by the staticiser 64 into the register store 2. Reset staticiser 64 and step P/Q.

(As far as any particular "register" is concerned sub-program (10) followed by sub-program (11) enables a sub-word of any word in the register store 2 to be transferred to any other location in that store.)

(12) TRANSFER A CONSTANT (SUB-WORD $\alpha$) TO THE INCREMENT UNIT 114

Step P/Q. Gate signals representing sub-word $\alpha$ from the staticiser 10 to the increment unit 114 to cause the sub-word to be stored by that unit. (It is necessary that the program sub-word $\beta$ causes a signal to be supplied over one of the trio of leads represented by the line 35 to identify highway B on the highway from which the sub-word signals are to be passed to the unit 114).

(Sub-program (12) followed by sub-program (11) enables a constant (the value of $\alpha$ during instruction (12)) to be written into a sub-word of any word in the register store 2.)

(13) TRANSFER A CONSTANT TO STATICISER 64 (SUB-WORDS A AND B)

Gate signals representing the program sub-words $\alpha$ and $\beta$ stored by the program output staticiser 10 respectively to the bistable circuits 63B and 63A of the register output staticiser 64 so that those sub-words are stored by the staticiser 64. Step P/Q.

(By using sub-program (13) followed by sub-program (9) it is possible to write a new word (into the register store 2) into the same storage location as one that had previously been read.)

(14) JUMP TO "STATE OF CALL"

Read a word from the register store 2 into the staticiser 64 as previously. Pass signals from the staticiser 64 to the program address staticiser 4 for the purpose of addressing the program store 1. Rewrite the word stored by the staticiser 64 into the register store 2.

(15) IF YES, JUMP (i) If the bistable circuit 107 in the decision unit 101 is set (due to a signal having been passed thereto by the gate 124 or over the lead 130) pass signals representing program sub-words $\alpha$ and $\beta$ to set the program address staticiser 4.

(This has the effect of utilising the sub-words $\alpha$ and $\beta$ in one program word to be used to determine the next program word read from the store 1.)

(ii) If the bistable circuit 107 is not so set, step P/Q.

(16) IF NO, JUMP (i) If the bistable circuit 107 in the decision unit 101 is not set to the state previously mentioned (in sub-program (15)) pass signals representing sub-words $\alpha$ and $\beta$ to set the program address staticiser 4.

(ii) If the bistable circuit 107 is set to said condition, step P/Q.

(17) UNCONDITIONAL JUMP

Pass signals representing program sub-words $\alpha$ and $\beta$ to set the program address staticiser 4.

(18) INTERROGATE OUTSIDE WORLD

Connect conversion unit 136 currently being addressed by the register address staticiser 46 to highway A by way of outside world unit 135. (This has the effect, inter alia, of supplying a pulse to the highway wire A5 if the subscriber's line wires 137 are looped but not otherwise.) Cause decision unit 101 to respond to the presence or absence of a pulse on a wire A1 to A5 of highway A (as specified by a signal supplied by the decoder 32). Step P/Q.

(19) PULSE OUTSIDE WORLD

Pass signals supplied by the $\beta$ decoder 32 via the highway A and the outside world unit 135 to the conversion unit 136 currently being addressed by the register address staticiser 46. Step P/Q.

(A signal supplied over one of the highway wires A1 to A5 to the conversion unit 136 in this way has the effect of changing the state of one or all of the bistable circuits 151 to 154 thereof and thereby controlling the electromagnetic relays SZ, P, FR and R. It will be recalled that the relay P, for example, serves to control the supply of output impulses to the leads 160.

(The sub-program (19) is also used to halt the operation of the register translator when all sixty-four "registers" have been processed. For this purpose a program sub-word $\beta$ is used that causes a signal to be supplied over lead 168 but not over any of the leads represented by the line 36. Accordingly no signal is passed at this time over the highway A to the outside world unit 135.)

(20) INCREMENT REGISTER ADDRESS AND INTERROGATE

Gate signals supplied by the bistable circuits 47 of the staticiser 46 into the increment unit 114. Cause the increment unit 114 to add "1" to the binary number represented by the digits of the sub-word stored by the bistable circuits 117 of that unit. Pass signals representing the incremented sub-word from the unit 114 back to the bistable circuits 47 of the staticiser 46.

(i) If now the number represented by the sub-word passed back to the staticiser 46 is zero (as indicated by the state of the bistable circuit 122 in the increment unit 114) pass a signal representing the state of the bistable circuit 48 of the staticiser 46 to the increment unit 114. Cause the increment unit 114 to add "1" to the number then stored thereby and pass a signal representing the incremented digit back to the bistable circuit 48. Step P/Q.

(ii) If the said number representing the sub-word stored by the bistable circuits 47 is not zero, step P/Q.

(It will be appreciated that this sub-program enables each "register" of the register store 2 and its associated conversion unit 136 to be addressed in turn.)

Figure 4:
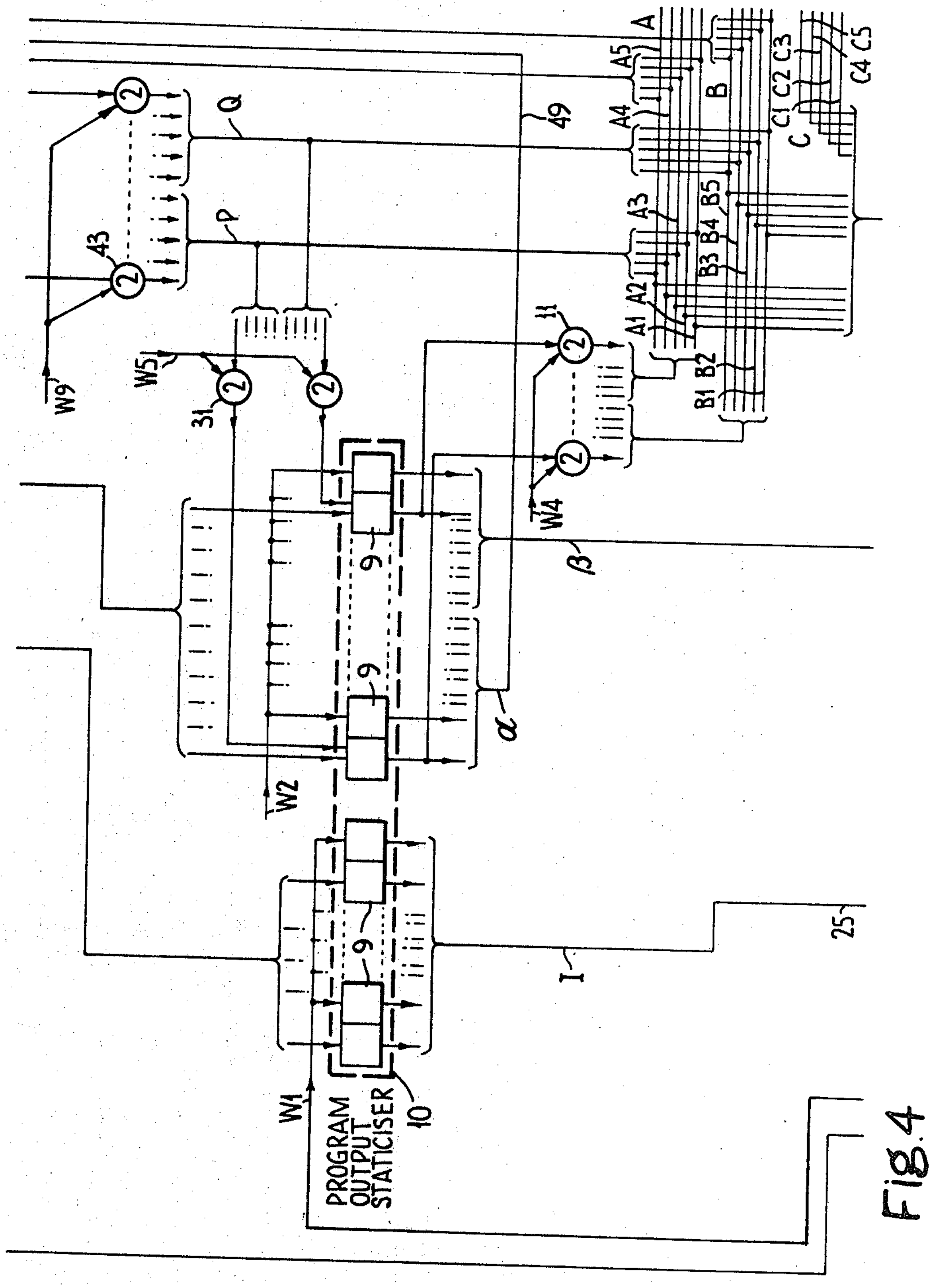
Figure 5:
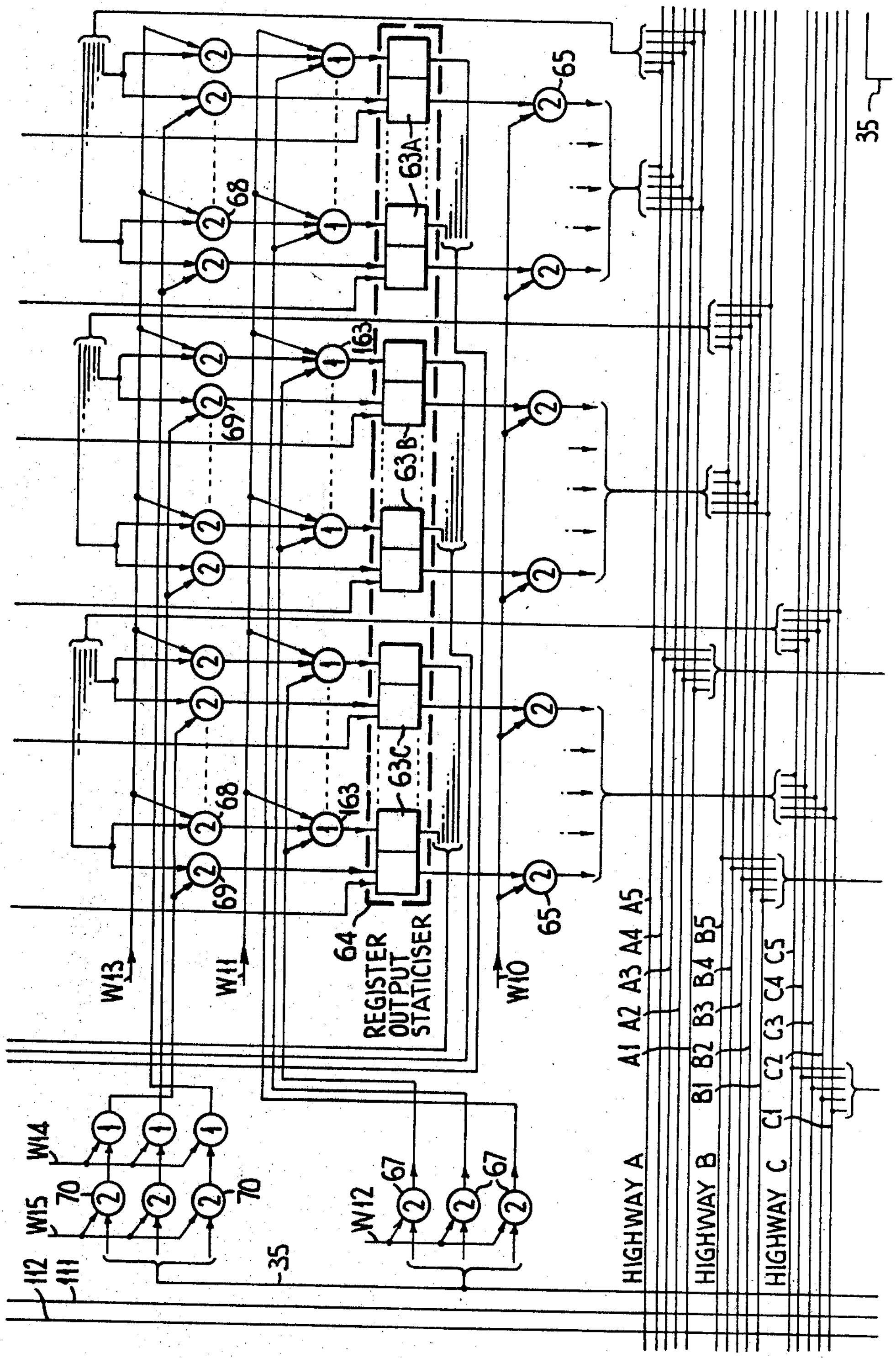
Figure 6:
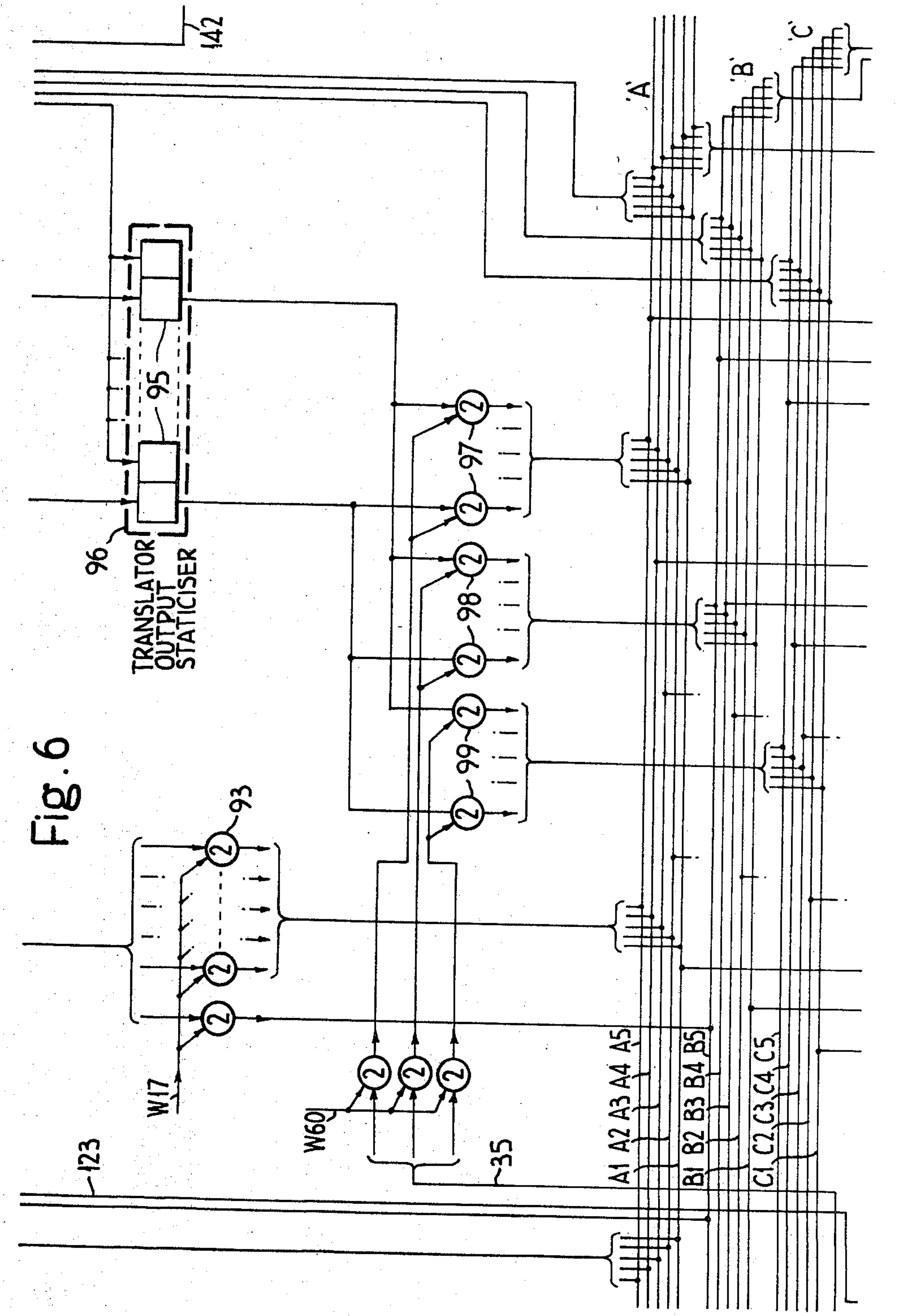

As previously mentioned, each sub-program involves one sequence of the timing pulses T1 to T15. Every sub-program involves a word being read from the program store 2 and this is effected by signals supplied by the bistable circuits 5, 18 and 172 under the control of timing pulses T1, T4, T5 and T8 as shown in FIG. 1, these timing pulses being supplied directly by the counter 30 (FIG. 4). Timing pulses T14 are also supplied directly by the counter 30 to trigger the bistable circuit 167 upon a signal being present on the lead 168.

Timing pulses T3 to T13 and T15 are supplied to leads throughout the equipment as required to effect the various sub-programs discussed above. Each sub-program is brought into operation by a uniquely associated sub-word I, the pulse distribution unit 29 responding to signals supplied thereto by the decoder 26 over the leads 28 to distribute the timing pulses as set out in the following table.

| Sub-program | Leads to which Timing Pulses are supplied | | | | | | | | | | | |
|---|---|---|---|---|---|---|---|---|---|---|---|---|
| | T3 | T4 | T5 | T6 | T7 | T8 | T9 | T10 | T11 | T12 | T13 | T15 |
| (1) | W42 | W44 | W43 | W12 | W28 | W27 | W28 | W27 | W42 | W48 | W43 | W11 |
| | W27 | W46 | W45 | | W30 | W9 | W6 | W9 | W28 | | W49 | W2 |
| | | | W47 | | W15 | W32 | W33 | W34 | W7 | | | |
| | | | W10 | | | W31 | W50 | | W35 | | | |
| | | | W26 | | | | | | W51 | | | |
| (2) | W42 | W44 | W43 | W12 | W28 | W27 | W28 | W27 | W42 | W48 | W43 | W11 |
| | W20 | W46 | W45 | | W30 | W9 | W6 | W9 | W28 | | W49 | W2 |
| | W27 | | W47 | | W15 | W32 | W33 | W34 | W7 | | | |
| | | | W10 | | | W31 | W50 | | W35 | | | |
| | | | W26 | | | | | | | | | |
| (3) | W42 | W44 | W43 | W28 | W27 | W10 | W9 | W7 | W42 | W48 | W43 | W11 |
| | W20 | W46 | W45 | W33 | | W66 | W34 | | W28 | | W49 | W2 |
| | W31 | W9 | W47 | W50 | | | | | W35 | | | |
| | W27 | W32 | W6 | | | | | | W51 | | | |
| (4) | W42 | W44 | W43 | W28 | W27 | W8 | W9 | W7 | W42 | W48 | W43 | W11 |
| | W31 | W46 | W45 | W33 | | W14 | W34 | | W28 | | W49 | W2 |
| | W27 | W9 | W47 | W50 | | | | | W35 | | | |
| | | W32 | W6 | | | | | | W51 | | | |
| (5) | W42 | W44 | W43 | W28 | W12 | W8 | W9 | W7 | W42 | W48 | W43 | W11 |
| | W31 | W46 | W45 | W33 | W27 | W13 | W34 | | W28 | | W49 | W2 |
| | W27 | W9 | W47 | W50 | | | | | W35 | | | |
| | | W32 | W6 | | | | | | W51 | | | |
| (6) | W42 | W44 | W43 | W28 | W19 | W10 | W9 | W7 | W42 | W48 | W43 | W2 |
| | W31 | W46 | W45 | W33 | W27 | W18 | W34 | | W28 | W54 | W49 | |
| | W27 | W9 | W47 | W50 | | | W53 | | W35 | | | |
| | | W32 | W6 | | | | | | W51 | | | |
| (7) | W42 | W44 | W43 | W31 | W28 | W27 | W9 | W28 | W42 | W48 | W43 | W11 |
| | W11 | W46 | W45 | W6 | W33 | W12 | W34 | W7 | W60 | | W49 | W2 |
| | W27 | W9 | W47 | W52 | W50 | W58 | W59 | W35 | W15 | | | |
| | W55 | W32 | | | | | W56 | W51 | | | | |
| | W57 | | | | | | | | | | | |
| (8) | W42 | W44 | W43 | W28 | W27 | W9 | W42 | W48 | W43 | W2 | W10 | W11 |
| | W31 | W46 | W45 | W33 | | W34 | W7 | W28 | W49 | | W5 | |
| | W27 | W9 | W47 | W50 | | | | W35 | | | | |
| | | W32 | W6 | | | | | W51 | | | | |
| (9) | W42 | W44 | W43 | W28 | W27 | W9 | W7 | W28 | W42 | W48 | W43 | W11 |
| | W31 | W9 | W45 | W33 | | W34 | | W35 | | | W49 | W2 |
| | W27 | W32 | W6 | W50 | | | | W51 | | | | |
| (10) | W42 | W44 | W43 | W28 | W27 | W9 | W7 | W28 | W42 | W48 | W43 | W11 |
| | W31 | W46 | W45 | W33 | | W34 | | W35 | W27 | W10 | W49 | W2 |
| | W27 | W9 | W47 | W50 | | | | W51 | | W26 | | |
| | | W32 | W6 | | | | | | | | | |
| (11) | W42 | W44 | W12 | W30 | W31 | W28 | W27 | W28 | W42 | W48 | W43 | W11 |
| | | W46 | W43 | W15 | W27 | W6 | W9 | W7 | | | W49 | W2 |
| | | | W45 | W68 | W9 | W33 | W34 | W35 | | | | |
| | | | W47 | | W32 | W50 | | W51 | | | | |
| (12) | W31 | W9 | W6 | W28 | W27 | W9 | W7 | W28 | W27 | W4 | | W2 |
| | W27 | W32 | | W33 | | W34 | | W35 | | W26 | | |
| | | | | W50 | | | | W51 | | | | |
| (13) | W31 | W9 | W6 | W28 | W27 | W9 | W7 | W28 | W4 | | | W2 |
| | W27 | W32 | | W33 | | W34 | | W35 | W14 | | | |
| | | | | W50 | | | | W51 | | | | |
| (14) | W42 | W44 | W43 | W61 | W10 | | | | W42 | W48 | W43 | W11 |
| | | W46 | W45 | | W25 | | | | | | W49 | W2 |
| | | | W47 | | | | | | | | | |
| (15) | W31 | W6 | W28 | W27 | W28 | W22 | W4 | | | | | W2 |
| | W27 | | W33 | W9 | W7 | | W21 | | | | | |
| | W9 | | W50 | W34 | W35 | | | | | | | |
| | W32 | | | | W51 | | | | | | | |
| (16) | W31 | W6 | W28 | W27 | W28 | W24 | W4 | | | | | W2 |
| | W27 | | W33 | W9 | W7 | | W23 | | | | | |
| | W9 | | W50 | W34 | W35 | | | | | | | |
| | W32 | | | | W51 | | | | | | | |
| (17) | | | | W61 | W4 | | | | | | | W2 |
| | | | | | W25 | | | | | | | |
| (18) | W20 | W9 | W6 | W28 | W27 | W62 | W9 | W7 | W28 | | | W2 |
| | W31 | W32 | | W33 | | W66 | W34 | | W35 | | | |
| | W27 | | | W50 | | | | | W51 | | | |
| (19) | W31 | W9 | W6 | W4 | W28 | W27 | W9 | W7 | W28 | | | W2 |
| | W27 | W32 | | W63 | W33 | | W34 | | W35 | | | |
| | | | | | W50 | | | | W51 | | | |
| (20) | W31 | W28 | W27 | W7 | W28 | W31 | W64 | W28 | W27 | W65 | W28 | W2 |
| | W27 | W6 | W9 | | W35 | W27 | | W33 | W17 | W20 | W35 | |
| | W9 | W33 | W34 | | W51 | W17 | | W16 | W34 | | W66 | |
| | W32 | W50 | | | | W32 | | | | | W67 | |

The sequence of sub-programs and the operations performed thereby during part of the complete program of the register translator is set out below. The number in brackets preceding the sub-programs refer to those quoted in the preceding paragraphs in respect of the various sub-programs. Initially the program address staticiser 4 is set by means of a "start" key (not shown) so as to store predetermined sub-words P and Q respectively, these words may conveniently both be the binary numbers 00000. (This point in the program sequence is subsequently referred to as "point X." Sub-program (19) is then initiated but the sub-word then stored by the staticiser 10 is such that the decoder 32 supplies a signal over the lead 168 so that the timing pulse T14 in this sub-program causes the gate 166 to "open" and thereby halt the supply of timing pulses. The program is resumed upon a pulse being supplied by the generator 169 (to signify the beginning of an eleven millisecond period in which all the "registers" are brought sequentially into operation) and, proceeds as follows from this point (which is subsequently referred to as "point Y").

(14) Jump to State of Call in Word 1 of "register" currently being addressed by the register address staticiser 46. This causes new sub-words P and Q to be written into the program address staticiser 4. The subsequent program is determined by these sub-words P and Q and depends on the particular State of Call (i.e. SOC A0, SOC A1 . . . etc.) read from the "register." The program initiated by different States of Call will now be considered separately.

SOC A0

(18) Interrogate outside world via the conversion unit 136 currently being addressed for a line break (as indicated by the relay A of that unit being released).

A0.1—(15) If YES (indicating that the "register" in question has not been allocated a call), Jump.

A0.2—If NO (indicating that the "register" in question has been allocated a call)—(13) transfer word SOC A1 to the bistable circuits 63A and 63B of register address staticiser 64.

(17) Unconditional jump (9) Write SOC A1 into register word 1.

(This point in the program sequence is substantially referred to as "point Z.")

(20) Add "1" to register address stored by staticiser 46 and interrogate for zero. (This interrogation is automatic in that the bistable circuit 107 in the decision unit 101 is automatically set if the numerical value of the incremented sub-words representing the register address is then zero.)

(16) If NO, jump to point Y. (This occurs if there is another "register" to be processed before the end of an eleven millisecond period in which each register is processed), or if YES proceed to point X. (This point is reached when all sixty-four "registers" have been processed and it is necessary to wait until the beginning of the next eleven millisecond period.)

SOC A1

(13) Transfer a constant (representing a Dialling-in Index) to bistable circuits 63A and 63B of register output staticiser 64;

(9) Write Dialling-in Index as register word 3

(13) Transfer word SOC B1 to staticisr 64

(9) Write SOC B1 as register word 2

(13) Transfer word SOC A2 to staticiser 64

(17) Unconditional jump (9) Write SOC A2 as register word 1.

Proceed to point Z.

SOC A2

(13) Transfer sub-words A and B of "Force release time-out" word (FRTO) to staticiser 64. (The sub-words are each of the form "11110" so as to represent the decimal number "30.")

(4) Write a "1" into digit 12 of register word 5. (This register word had previously been erased so that all the other digits of sub-word C are then "0." This sub-program also serves to write the sub-words stored by the bistable circuit 63A and 63B of the staticiser 64 as sub-words A and B respectively of register word 5. The complete FRTO word is then stored as register word 5.)

(13) Transfer word SOC A3 to staticiser 64

(9) Write SOC A3 as register word 1

(14) Jump to State of Call B) i.e. register word 2). (The sub-programs that follow the jump to State of Call B will be considered subsequently.)

SOC A3

(18) Interrogate outside world for a line break (i.e. to see whether or not the relay A is released)

A3.1—if NO—

(2) Subtract "1" from the sub-word A of register word 5 and interrogate for all zeros A3.1.1—if NO—

(14) Jump to State of Call B in register word 2

A3.1.2—if YES (signifying that there has been no input impulse during the preceding interval equal to thirty 11 millisecond periods), jump

(13) Transfer FRTO (sub-word A only) to staticiser 64

(2) Subtract "1" from sub-word B of register word 5 and interrogate for all zeros. (This sub-program also has the effect of re-writing sub-word A of the FRTO word from staticiser 64 into the register.)

A3.1.2.1—if NO—

(14) Jump to State of Call B in register word 2

A3.1.2.2—(15) If YES (signifying that there has been no input impulse during the preceding interval equal to nine hundred 11 millisecond periods), jump

(13) Transfer FRTO (sub-word B only) to staticiser 64

(2) Subtract "1" from sub-word C of register word 5 and interrogate for all zeros. (This sub-program also has the effect of re-writing sub-ward B of the FRTO word from staticiser 64 into the register.)

A3.1.2.2.1—If NO, jump to State of Call B in the register word 2

A3.1.2.2.2—(15) If YES (signifying that there has been impulse during the preceding interval equal to eighteen hundred 11 milliseconds periods i.e. approximately 20 seconds), jump

(19) Operate relay SZ in the appropriate conversion unit 136

(13) Transfer word State of Call "Forced Release" to staticiser 64

(17) Unconditional jump (9) Write State of Call "Forced Release" as register word 1. (This State of Call is subsequently used to initiate sub-programs that cause the relay FR to be operated and bring about release of the conversion unit 136 and its associated "register.")

Proceed to point Z

A3.2—(15) If YES, jump (3) Interrogate digit 15 of register word 4. (It will be appreciated that the result of this interrogation is only YES when the processing of a call has reached the stage in which there is access to a translation storage location in the translator store 3.)

A3.2.1—If NO—

(13) Transfer word SOC A4 to staticiser 64

(17) Unconditional jump (9) Write SOC A4 into register word 1

Proceed to point Z.

A3.2.2—(15) If YES, jump

(13) Transfer word SOC A6 to staticiser 64

(9) Write SOC A6 into register word 1

(14) Jump to State of Call B in register word 2.

SOC A4

(6) Address translator store 3 with register word 8. (This has the effect of initially enabling the digits B and subsequently the digits D to be read from the translator store.)

(7) Write digits B or D read from translator store 3 as digits 11 to 14 of register word 4

(5) Erase digit 15 of register word 4

(13) Transfer word SOC A5 to staticiser 64

(17) Unconditional jump (9) Write SOC A5 as register word 1

Proceed to point Z.

SOC A5

(2) Subtract "1" from digits B or D stored as digits 11 to 14 of register word 4 and interrogate for all zeros. (This point in the program is reached as a result of an input impulse and if the result of this interrogation is YES it will be appreciated that it is then necessary to read out the address (i.e. the digits C or E) of the next storage location within the translator store 3 to which access is to be made. This is effected by the following sequence of sub-programs.)

A5.1—If YES—

(1) Add "1" to output selection address (sub-word C of register word 8)

(6) Address translator store 3 with register word 8 (in respect of group of digits forming part of address of new storage location)

(7) Transfer group of address digits to sub-word A of register word 4

(1) Add "1" to output selection address (sub-word C of register word 8)

(6) Address translator store 3 with register word 8 (in respect to the other group of digits of the new translator store address)

(7) Transfer this group of digits to sub-word B of register word 4

(6) Address translator store 3 with register word 4 (this sub-program causes the two sub-words representing the digits C or E to be stored by the bistable circuits 63A and 63B of the staticiser 64)

(9) Write sub-words stored by the bistable circuits 63A and 63B as sub-words A and B of register word 8

(13) Transfer word SOC A6 to circuits 63A and 63B of staticiser 64

(17) Unconditional jump (9) Write SOC A6 as register word 1

Proceed to point Z.

A5.2—(16) If NO, jump

(13) Transfer word SOC A6 to staticiser 64

(17) Unconditional jump (9) Write SOC A6 as register word 1

Proceed to point Z.

SOC A6

(8) Set program output staticiser 10 (sub-words $\alpha$ and $\beta$) to Dialling-in Index at register word 3. (The first time this point in the program is reached the Dialling-in Index gives the address of sub-word A of register word 9.)

(1) Add "1" to sub-word specified by Dialling-in Index stored by staticiser 10. (The sub-word in question initially stores zero and is subsequently incremented by this sub-program in response to input impulses.)

(9) Erase register word 5 (to terminate the forced release time out)

(4) Write digit 15 of register word 5 as a "1." (This has the effect of starting the release time-out in the event of an abandoned call.)

(13) Transfer word SOC A7 to staticiser 64

(9) Write SOC A7 as register word 1

(14) Jump to State of Call B.

SOC A7

(18) Interrogate outside world for a line break (i.e. an input impulse)

A7.1—If YES—

(2) Subtract "1" from sub-word C of register word 5 and interrogate for all zeros A7.1.1—If NO—jump to State of Call B in register word 2

A7.1.2—(15) If YES (signifying that there has been an input "impulse" during an interval equal to sixteen 11 millisecond periods indicating that the call has been abandoned), jump

(13) Transfer word SOC Release to staticiser 64

(17) Unconditional jump (9) Write SOC Release as register word 1

A7.2—(16) If NO, jump (9) Erase register word 5 (to terminate release time-out)

(4) Write digit 5 of register word 5 as a "1" (for the purpose of sub-word A of register word 5 being used to time an intertrain pause)

(13) Transfer word SOC A8 to staticiser 64

(9) Write SOC A8 into register word 1

(14) Jump of State of Call B in register word 2.

SOC A8

(18) Interrogate outside world for line break

A8.1—If NO, (2) Subtract "1" from sub-word A of register word 5 and interrogate for zeros A8.1.1—If NO,

(14) Jump to State of Call B in register word 2

A8.1.2—(15) If YES (signifying that the period of an intertrain pause has been timed), jump

(13) Transfer word SOC A9 to staticiser 64

(9) Write SOC A9 as register word 1

(14) Jump to State of Call B in register word 2

A8.2—(15) If YES, jump

(13) Transfer word SOC A10 as register word 1

(14) Jump to State of Call B in register word 2.

SOC A9

(3) Interrogate digit 15 of register word 4. (This interrogation is to determine whether or not the storage location currently being addressed by register word 8 is one associated with a link or with a translation. Although this digit has previously been stated (see the program under SOC A4) to be erased, the digit may in fact have been subsequently rewritten as a "1" during a subsequent part of the complete program before this point in the program is reached.)

A9.1—If NO (i.e. digit 15 of register word 4 is a "0" indicating that the storage location is one associated with a link)—

(3) Interrogate digits 11 to 14 of register word 4 (i.e. digits B or D) for zeros. (Since this point in the program is reached after an intertrain pause has been timed, these digits must be zero for a successful call.)

A9.1.1—If YES—

(13) Transfer word SOC A11 to staticiser 64

(17) Unconditional jump (9) Write SOC A11 as register word 1

A9.1.2—(16) If NO, jump

(13) Transfer word SOC Force Release to staticiser 64

(17) Unconditional jump (9) Write SOC Force Release as register word 1

A9.2—(15) If YES, jump

(13) Transfer word SOC A11 to staticiser 64

(9) Write SOC A11 as register word 1

(14) Jump to State of Call B in register word 2

SOC A10

(3) Interrogate digit 15 of register word 4

A10.1—If NO (3) Interrogate digits 11 to 14 of register word 4 for zeros A10.1.—If YES

(13) Transfer word SOC A4 to stores 38 and 39

(17) Unconditional jump (9) Write SOC A4 into register word 1 (It will be appreciated that the sequence of sub-programs A10.1.1 is brought into operation when (a) the storage location of the translator store 3 currently being addressed by the register word 8 is not one associated with a translation and (b) the necessary number of input impulses have been received to require access to be given to a new location in that store. This sequence has the effect of returning to an earlier point in the program to enable the register translator to respond to further impulses to enable a new translator store location to be addressed.)

A10.1.2—(16) If NO, jump

(13) Transfer word SOC A5 to staticiser 64

(17) Unconditional jump (9) Write SOC A5 as register word 1 (The sequence A10.1.2 is operated when the digits B (or D) are not zero signifying that further impulses must be received by the register translator before access can be made to the next storage location in the translator store 3 and serves to return to an earlier point in the program to enable the translator to respond to such further impulses.)

A10.2—(15) If YES, jump

(13) Transfer word SOC A6 to stores 38 and 39

(9) Write SOC A6 to stores 38 and 39

(9) Write SOC A6 as register word 1

(14) Jump to State of Call B in register word 2 and so on in respect of SOC A11, A12, etc. Briefly the sequences described enable a translation location in the translator store 3 to be reached, information in respect of the input routing digits being stored in the register as sub-words A, B, C of register word 9, etc. Information in respect of the numerical digits are subsequently stored as sub-words of the following register words.

Turning now to the program sequence that follow the sub-program "Jump to State of Call B" in register word 2 (14):

SOC B1

(This point is reached when impulsing-out has not commenced.)

(17) Unconditional jump
Proceed to point Z.

SOC B2

(12) Transfer sub-word α from program output staticiser 10 to increment unit 114

(11) Transfer sub-word stored by increment unit 114 to sub-word C of register word 8

(6) Address translator store 3 with register word 8 (to apply for the number of routing digits in translator word)

(7) Write the number of routing digits as sub-word C of register word 3

(12) Transfer sub-word α from staticiser 10 to increment unit 114. (This sub-word provides information as to the particular routing digit subsequently to be selected from the translator word.)

(11) Transfer sub-word from increment unit 114 to sub-word C of register word 8

(13) Transfer word SOC B3 to staticiser 64

(9) Write SOC B3 as register word 2

(17) Unconditional jump
Proceed to point Z.

SOC B3

(6) Address translator store 3 with register word 8 to apply for routing digit (8) Set program output staticiser 10 (sub-words α and β) to Impulsing-out Index at register word 4. (The first time this point on the program is reached the Impusing-out Index may address the register sub-word that previously stored the last input routing digit, say sub-word C of register word 9 if there were three input routing digits.)

(7) Transfer routing digit from translator store 3 to register sub-word specified by Impulsing-out Index (2) Subtract "1" from sub-word C of register word 3

(13) Transfer word SOC B4 to staticiser 64

(9) Write SOC B3 as register word 2

(17) Unconditional jump
Proceed to point Z.

SOC B4

(12) Transfer sub-word "00110" from program output staticiser 10 (sub-word α) to increment unit 114

(11) Transfer sub-word stored by increment unit 114 to sub-word A of register word 7. (This sub-word is numerically equal to "six" so that by subtracting one from it during each of a succession of machine cycles a period of sixty six milliseconds may be timed.)

(19) Supply pulse to associated conversion unit 136 to cause the relay P to be released thereby initiating an outgoing impulse.)

(13) Transfer word SOC B5 to staticiser 64

(9) Write SOC B5 as register word 2

(17) Unconditional jump
Proceed to point Z.

SOC B5

(2) Subtract "1" from sub-word A of register word 7 and interrogate for all zeros B5.1—If YES (indicating that the sixty six millisecond period has been timed)—

(13) Transfer word SOC B6 to staticiser 64

(9) Write SOC B6 as register word 2

(17) Unconditional jump
Proceed to point Z.

B5.2—(16) If NO, jump
Proceed to point Z (It will be appreciated that the sequence SOC B5 is such that the sixty six millisecond period is always timed between release of the relay P in the conversion unit 136 before proceeding to SOC B6.)

SOC B6

(19) Supply pulse to conversion unit 136 to cause the relay P to be reoperated thereby terminating the impulse

(13) Transfer word SOC B7 to staticiser 64

(9) Write SOC B7 as register store 2

(17) Unconditional jump
Proceed to point Z.

SOC B7

(13) Transfer word SOC B8 to staticiser 64

(9) Write SOC B8 as register word 2

(17) Unconditional jump
Proceed to point Z.

SOC B8

(8) Transfer Pulsing-out Index of register word 4 to program output staticiser 10

(2) Subtract "1" from sub-word specified by Pulsing-out Index and interrogate for zeros B8.1—If YES (indicating that all the impulses of that routing digit have been impulsed out)—

(13) Transfer word SOC B9 to staticiser 64

(9) Write SOC B9 into register word 2

(17) Unconditional jump
Proceed to point Z.

B8.2—(16) If NO, jump

(13) Transfer word SOC B4 to staticiser 64

(9) Write SOC B4 into register word 2

(17) Unconditional jump
Proceed to point Z.

(The program sequence B8.2 is followed when all the impulses of the particular routing digit have not been impulsed out and causes the program to revert to an earlier point to enable this to be done. The sequences B6, B7 and B8 ensure that there is an interval of three machine cycles, i.e. 33 milliseconds between successive impulses) and so on in respect of SOC B9, B10 etc. Briefly the register translator is operated so that each routing digit to be impulsed-out is transferred in turn from the translator store 3 to the same sub-word location in the register store 2, each of these digits being utilised to cause a train of impulses to be sent out in the manner described. Subsequently the numerical digits stored at other register locations as previously explained are impulsed-out in the same way.

It will, of course, be appreciated that each sub-program in the sequences set out above results from a program word being read from the program store 1 that is unique to that sub-program. Since however the sub-programs in any one sequence, for example the sequence SOC A1, A3.1.2.2 or B5.1, are linked by "step P/Q," it follows that the program address must be separated.

Although only part of the complete program of the register translator is given above, it is believed that it is sufficient to enable those skilled in the art to appreciate the manner in which the register translator operates to respond to input trains of impulses and to supply the required output trains of impulses.

In the arrangement of register translator described above, sub-word C of Word 4 of a "register" signifies the number of impulses, namely the digit B or the digit D, that must be received before a new application can be made to the translator store 3. As each impulse is received the number stored at this sub-word location of the register store 2 is reduced by one and application is made to the translator store 3 for a new value of the digit B (or D) when this number is zero.

In a modified arrangement, each decimal input routing digit is received in full before it is processed and for this purpose each received impulse of an input routing digit is caused to add "1" to the number stored at the "register" storage location, for example a sub-word of Word 9, Word 10 etc., appropriate to that routing digit so that the binary representation of that digit is stored at that locaion when the inter-digit pause occurs. (It will be appreciated that impulses received after the inter-digit pause are in respect of the next decimal digit and are therefore used to increment the storage location associated with that digit.) Upon an inter-digit pause being detected, the number stored at the appropriate routing digit storage location, say the sub-word A of Word 9 for the first routing digit, the sub-word B of Word 9 for the second routing digit and so on, is transferred to a special "register" storage location which may conveniently be sub-word C of Word 6 (which is not otherwise utilised) and a sub-routine is then initiated by which the number stored at the special location and the digit B (or D) are both incremented by having "1" subtracted therefrom at each of a succession of machine cycles until one or other is reduced to zero. If now the number stored at sub-word C of Word 4 (which was initially the decimal digit B (or D)) is reduced to zero first, the application is then made as before to the translator store 3 for a new "reset address" and this is repeated until this number is zero. (If the number stored at the special storage location is reduced to zero which the number stored as sub-word C of Word 4 is not zero, it is clear that the information has been dialled in corresponding to a "spare" location of the translator store 3 and accordingly a "forced release" sequence is then initiated.)

The modified arrangement just considered is particularly suited to a system in which input information is not in the form of trains of impulses as so far considered but is of the kind in which end digit is signalled as the combination of two, say, audio frequency tones selected from a group, four say, of such tones. A somewhat different form of conversion unit is required to handle this kind of input information, but it does enable the value of each digit as received to be written straight into the appropriate location of "register" words 9 to 14. The subsequent processing of the input routing digits is then as described in the last paragraph.

It will be appreciated that the present invention enables the disposition of the locations at which translation words are stored by the translator store 3 to be quite arbitrary and unrelated to the organisation tree of the translator. Furthermore the organisation tree may be changed (for example by extension to bring into use translation word storage locations that had not previously been used) merely by re-threading the appropriate address wires 73 (FIG. 16) through the relevant "linear" cores of that store.

We claim:

1. A translator for a telecommunication switching system, said translator comprising a plurality of groups of storage means which are associated with different input information that may be supplied to the translator and some of which storage means are translation storage means each of which stores information to be supplied in respect of a particular translation and others of which storage means are intermediate storage means, means responsive to input information applied to the translator to gain access in turn to a succession of said storage means of which the last is a translation storage means and the others are intermediate storage means, each intermediate storage means storing information as to the next storage means to which access should be made both if that storage means is in the same group as the immediately preceding intermediate storage means or if that storage means is in a different group, and means to read out information stored by the said last translation storage means to which access is gained.

2. A translator according to claim 1 wherein the translation of storage means and the intermediate storage means are provided at different addresses within a common digital data store.

3. A translator for a telecommunication switching system, said translator comprising a plurality of groups of storage means which are associated with different input information that may be supplied to the translator and some of which storage means are translation storage means each of which stores information to be supplied in respect of a particular translation and others of which storage means are intermediate storage means each of which stores both a first address of one of such storage means to which access is next to be made if it is in the same group of the translator as the immediately preceding intermediate storgae means and a second address of one of said storage means to which access is next to be made if it is in a different group, an input path, a register having provision for temporarily storing the address of one of said storage means, means responsive to electric signals which are supplied over said input path and which represent input information supplied to the translator to replace the particular address stored by the register at any time by the first address stored by the storage means having that particular address if the next storage means is in the same group, means responsive to said electric signals supplied over said input path to replace the particular address stored by the register at any time by the second address stored by the storage means having that particular address if the next storage means is in another group, an output path, means to identify that an address stored by said register is of a translation storage means, and means responsive to the last-mentioned means to supply to said output path electric signals representing the information stored by a translation storage means the address of which is stored by said register.

4. A translator according to claim 3 wherein at least some of the intermediate storage means also each store information as to the additional minimum value of a signal to be signalled over said input path before proceeding to the next storage means in the same group and information as to the minimum value of the next signal to be signalled over said input path before proceeding to the next storage means in another group.

5. A translator according to claim 3 wherein there are also provided means for temporarily storing information which is additional to that required for the purpose of effecting a translation and which is represented by electric signals supplied over said input path, and means for subsequently supplying to the output path electric signals representing the information stored by the last-mentioned means.

6. A translator for a telecommunication system comprising an input path over which is supplied input information to the translator in the form of a plurality of trains of impulses, the number of impulses in each such a train representing one decimal digit and adjacent trains being separated by an inter-digit pause, a plurality of digital storage means some of which digital storage means are translation storage means each of which stores information to be supplied in respect of a particular translation and others of which digital storage means are intermediate storage means each of which stores (a) the address of a first digital storage means,
(b) information in respect of a particular first decimal digit value,
(c) the address of a second digital storage means, and
(d) information in respect of a particular second decimal digit value, a register having provision for temporarily storing the address of one of said storage means, pause detecting means responsive to impulses supplied over said input path to detect an inter-digit pause, counting means responsive to the number of impulses supplied over said input path, first address changing means responsive to an inter-digit pause not having been detected by said pause detecting means to replace the address of a particular storage means stored at any time by said register by the address of the first storage means stored by that particular storage means when the number of impulses counted by said counting means equals the first decimal digit value stored by that particular storage means, second address changing means responsive to an inter-digit pause having been detected by said pause detection means to replace the address of a particular storage means at any time by said register by the address of the second storage means stored by that particular storage means when the number of impulses counted by said counting means equals the second decimal digit value stored by that particular storage means, means to reset said counting means when the address stored by said register is changed by one of the first and second address changing means, an output path, means to identify that a storage means the address of which is temporarily stored by said register is a translation storage means, and means responsive to the identifying means having identified that the particular storage means the address of which is stored by said register is a translation storage means to supply to said output path electric signals representing the translation information stored at that particular sorage means.

References Cited

UNITED STATES PATENTS

| | | |
|---|---|---|
| 3,267,220 | 8/1966 | Maneschi. |
| 3,284,574 | 11/1966 | Kostogiannis et al. |

WILLIAM C. COOPER, Primary Examiner